United States Patent [19]

Oguchi et al.

[11] Patent Number: 4,923,390
[45] Date of Patent: May 8, 1990

[54] OPTICAL RECORDING MEDIUM IR-RAY ABSORPTIVE COMPOUND AND OPTICAL RECORDING MEDIUM BY USE THEREOF

[75] Inventors: Yoshihiro Oguchi; Hiroyuki Sugata, both of Yokohama; Kyo Miura, Sagamihara; Tetsuro Fukui, Kawasaki; Yoshio Takasu, Tama, all of Japan

[73] Assignee: Canon Kabushiki Kaisha, Tokyo, Japan

[21] Appl. No.: 227,862

[22] Filed: Aug. 2, 1988

Related U.S. Application Data

[63] Continuation-in-part of Ser. No. 106,820, Oct. 13, 1987, abandoned.

[30] Foreign Application Priority Data

Oct. 14, 1986 [JP] Japan .................................. 61-244609
Oct. 23, 1986 [JP] Japan .................................. 61-253301
Aug. 4, 1987 [JP] Japan .................................. 62-194597

[51] Int. Cl.$^5$ .......................... G11B 7/24; B41M 5/26; G03C 5/16; G03C 1/72

[52] U.S. Cl. ..................................... 430/270; 430/495; 430/945

[58] Field of Search ..................... 430/270, 495, 945

[56] References Cited

U.S. PATENT DOCUMENTS

| 4,547,444 | 10/1985 | Bell et al. | 430/11 |
| 4,626,496 | 12/1986 | Sato | 430/270 |
| 4,656,121 | 4/1987 | Sato et al. | 430/495 |
| 4,782,006 | 11/1988 | Nishimura et al. | 430/292 |

FOREIGN PATENT DOCUMENTS

| 3503995 | 8/1985 | Fed. Rep. of Germany . |
| 3537539 | 4/1986 | Fed. Rep. of Germany . |

Primary Examiner—Paul R. Michl
Assistant Examiner—Mark R. Buscher
Attorney, Agent, or Firm—Fitzpatrick, Cella, Harper & Scinto

[57] ABSTRACT

An optical recording medium comprises at least one of polymethine type dyes represented by the formulae [1-I] through [2-IV] shown below, and a compound selected from an aminium salt compound and a diimonium salt compound in a recording layer.

10 Claims, 3 Drawing Sheets

OPTICAL RECORDING MEDIUM IR-RAY ABSORPTIVE COMPOUND AND OPTICAL RECORDING MEDIUM BY USE THEREOF

This application is a continuation-in-part of application Ser. No. 106,820, filed Oct. 13, 1987, now abandoned.

BACKGROUND OF THE INVENTION

1. Field of the Invention

This invention relates to an optical recording medium, particularly to an optical recording medium improved in recording and reproduction characteristics and storage stability which can be used for optical disc or optical card.

2. Related Background Art

Generally speaking, optical recording medium such as optical disc and optical card can memory high density information by making optically detectable small (e.g. about 1μ) pits formed on a thin recording layer provided on a substrate in the form of a spiral or circular and linear track. For writing information on such a disc, laser converged on the surface of a laser sensitive layer is scanned and only the surface irradiated with the laser beam forms pits, which pits are formed in the form of spiral or circular or linear track. The laser sensitive layer can absorb the laser energy to form optically detectable pits. For example, according to the heat mode recording system, the laser sensitive layer can absorb heat energy and form small concavities (pits) through evaporation or melting at that site. On the other hand, according to another heat mode recording system, by absorption of the irradiated laser energy, a pit having optically detectable density difference at that site can be formed.

As the optical recording medium to be used in this kind of optical recording and reproduction device, there have been known those constituted of a substrate, a metal reflective layer and a recording layer containing a dye. Such optical recording medium is formed so as to detect easily the reflected light by permitting the laser beam incident on the recording layer containing a dye to reach the metal reflective layer to be reflected thereagainst, and the above metal reflective layer in this case is provided for supplementing the amount of reflected light which is insufficient only with the recording layer.

When a dye with great light absorption for laser beam is used as the organic dye thin film, light absorption reflective film exhibiting metallic lustre (reflectance 10 to 50%) is obtained to give an optical recording medium capable of laser recording and reflective reading. Particularly, when a semiconductor laser of oscillation wavelength of 700 to 850 nm is used as the laser light source, there is the advantage that the device can be made compact and low cost.

However, because the organic dye thin film is generally susceptible to material change caused by heat and light, there have been involved the problem that recording reproduction characteristic and storage stability are lowered.

Also, since optical recording medium performs recording with strong laser power and further reproduction with weaker laser power by use of the same laser as in the recording method as described above, the threshold value to laser power is required to be distinct. However, for organic dye thin films, distinct threshold value as mentioned above can be obtained with difficulty, as compared with inorganic thin films, and tends to be deteriorated during reproduction.

For prevention of such deterioration of organic dye thin film, there has been proposed an invention in which a photostabilizer such as aminium compound or diimonium compound is added to the organic dye thin film (GB 2155811A).

SUMMARY OF THE INVENTION

An object of the present invention is to provide an optical recording medium which is improved particularly in stability to heat and light of an organic dye thin film and enhanced in long term storability and repeated reproduction characteristics by addition of a light stabilizer.

Another object of the present invention is to provide an optical recording medium which has high sensitivity and C/N ratio (carrier/noise ratio), and is also excellent in recording reproduction characteristics having clear threshold value to laser power.

Still another object of the present invention is to provide an IR-ray absorptive compound which is improved in light resistance and repeated reproduction durability and further better in solvent solubility and yet excellent in productivity as compared with those of the prior art and an optical recording medium having light resistance, repeated reproduction durability by use thereof.

According to the present invention, there is provided an optical recording medium comprising at least one of polymethine type dyes represented by the formulae [1-I] through [2-IV] shown below, and a compound selected from an aminium salt compound and a diimonium salt compound contained in a recording layer:

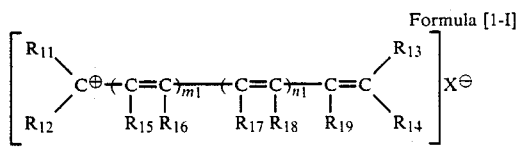

Formula [1-I]

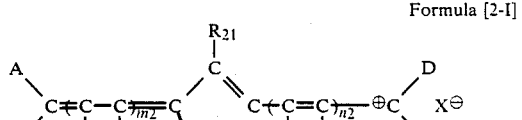

Formula [2-I]

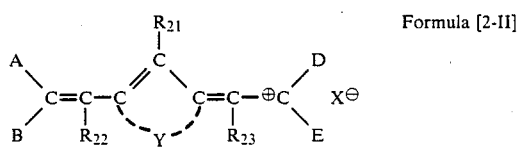

Formula [2-II]

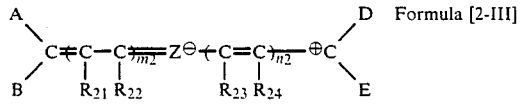

Formula [2-III]

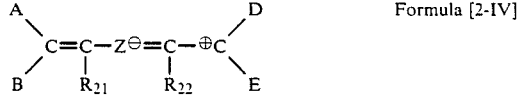

Formula [2-IV]

wherein $R_{11}$, $R_{12}$, $R_{13}$, $R_{14}$, $R_{15}$, $R_{16}$, $R_{17}$, $R_{18}$ and $R_{19}$ each represent hydrogen atom, a halogen atom, a substituted or unsubstituted alkyl group, a substituted or unsubstituted aryl group, a substituted or unsubstituted styryl group or a substituted or unsubstituted heterocyclic group; with proviso that at least one of $R_{11}$, $R_{12}$, $R_{13}$ and $R_{14}$ is a dialkylamino-substituted aryl group; $m_1$ is 0 or 1; $n_1$ is 0, 1 or 2; A, B, D and E each represent hydrogen atom, a halogen atom, a substituted or unsubstituted alkyl group, an alkenyl group, a substituted or unsubstituted aralkyl group, a substituted or unsubstituted aryl group; with proviso that at least one of A, B, D and E is a dialkylamino-substituted aryl group; $R_{21}$, $R_{22}$, $R_{23}$, $R_{24}$, and $R_{25}$ each represent hydrogen atom, a halogen atom, or an alkyl group; $m_2$, $n_2$ are each 0, 1 or 2; Y represents a divalent residue having a group of atoms necessary for completing a 5-membered ring or a 6-membered ring; $Z^\ominus$ represents

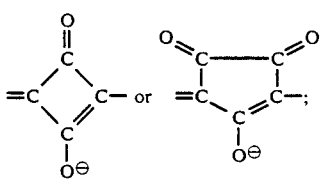

$X^\ominus$ represents an anion.

The IR-ray absorptive compound of the present invention is represented by the following formula (5) or (6):

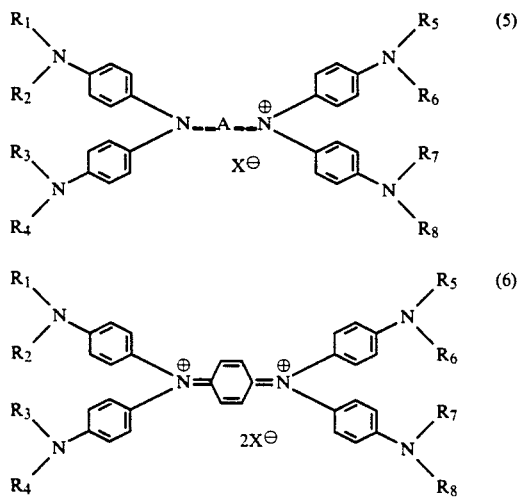

(wherein A represents

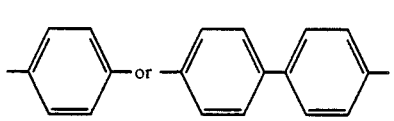

which may be substituted with alkyl, halogen or alkoxy; $X^\ominus$ represents an anion; $R_1$ through $R_8$ each represent a substituent having 1 to 8 carbon atoms, and at least one of them is an alkoxyalkyl group, an alkenyl group or alkynyl group).

Further, the optical recording medium of the present invention is characterized by containing a compound of the formula (5) and/or (6) in an organic dye thin film:

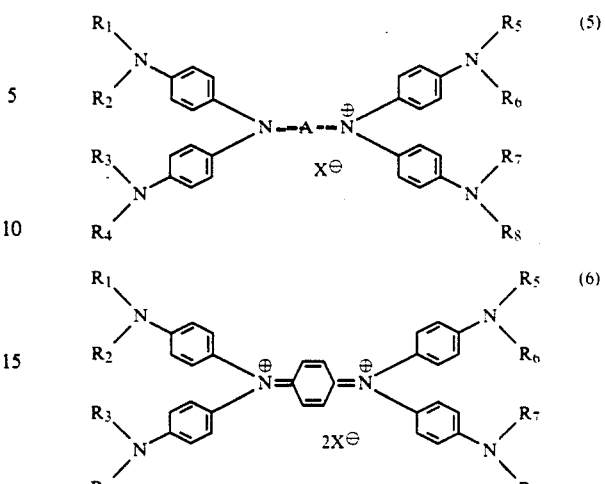

(wherein A represents

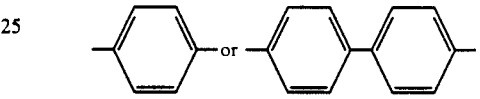

which may be substituted with alkyl, halogen or alkoxy; $X^\ominus$ represents an anion; $R_1$ through $R_8$ each represent a substituent having 1 to 8 carbon atoms, and at least one of them is an alkoxyalkyl group, an alkenyl group or alkynyl group).

DESCRIPTION OF THE PREFERRED EMBODIMENTS

Figure 1:
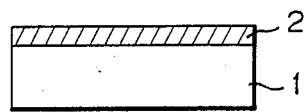
FIGS. 1 to 4 are a sectional view of each concrete example of the optical recording media of the present invention.

The optical recording medium of the present invention is accomplished by having an organic dye thin film containing a dye selected from polymethine dyes represented by the formulae [1-I] to [2-IV] shown below and a compound selected from aminium salt compounds and diimonium salt compounds in a recording layer.

Formula [1-I]

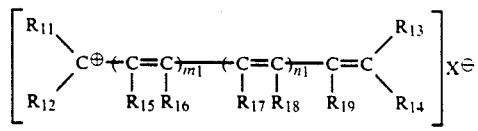

$R_{11}$, $R_{12}$, $R_{13}$, $R_{14}$, $R_{15}$, $R_{16}$, $R_{17}$, $R_{18}$ and $R_{19}$ may include hydrogen atom, halogen atom, alkyl group (e.g. methyl, ethyl, n-propyl, iso-propyl, n-butyl, sec-butyl, iso-butyl, t-butyl, n-amyl, t-amyl, n-hexyl, n-octyl, t-octyl, etc.), further other alkyl groups such as substituted alkyl group (e.g. 2-hydroxyethyl, 3-hydroxypropyl, 4-hydroxybutyl, 2-acetoxyethyl, carboxymethyl, 2-carboxyethyl, 3-carboxypropyl, 2-sulfoethyl, 3-sulfopropyl, 4-sulfobutyl, 3-sulfatepropyl, 4-sulfatebutyl, N-(methylsulfonyl)carbamylmethyl, 3-(acetylsulfamyl)-propyl, 4-(acetylsulfamyl)butyl, etc.), cyclic alkyl group (e.g. cyclohexyl, etc.), alkenyl group (vinyl, allyl, propenyl, butenyl, pentenyl, hexenyl, heptenyl, octenyl, dodecyl, prenyl, etc.), aralkyl group (e.g. benzyl, phenethyl, α-naphtylmethyl, β-naphthylmethyl, etc.), substituted aralkyl group (e.g. carboxybenzyl, sulfobenzyl, hydroxybenzyl, etc.). Further, $R_{11}$, $R_{12}$, $R_{13}$, $R_{14}$, $R_{15}$, $R_{16}$, $R_{17}$, $R_{18}$ and $R_{19}$ represent substituted or unsubstitute aryl group (e.g. phenyl, naphthyl, tolyl, xylyl, methoxyphenyl, dimethoxyphenyl, trimethoxyphenyl, ethoxyphenyl, dimethylaminophenyl, diethylaminophenyl, dipropylaminophenyl, di-n-butylaminophenyl, dibenzylaminophenyl, diphenylaminophenyl, etc.), substituted or unsubstituted heterocyclic group (e.g. pyridyl, quinolyl, lepidyl, methylpyridyl, furyl, thienyl, indolyl, pyrrole, carbazolyl, N-ethylcarbazolyl, etc.) or substituted or unsubstituted styryl group (e.g. styryl, methoxystyryl, dimethoxystyryl, trimethoxystyryl, ethoxystytyl, dimethylaminostyryl, diethylaminostyryl, dipropylaminostyryl, dibenzylaminostyryl, diphenylaminostyryl, 2,2-diphenylvinyl, 2-phenyl-2-methylvinyl, 2-(dimethylaminophenyl)-2-phenylvinyl, 2-(diethylaminophenyl)-2-phenylvinyl, 2-(dibenzylaminophenyl)-2-phenylvinyl, 2,2-di(diethylaminophenyl)vinyl, 2,2-di(methoxyphenyl)vinyl,2,2-di(ethoxyphenyl)vinyl, 2-(dimethylaminophenyl)-2-methylvinyl, 2-(diethylaminophenyl)-2-ehtylvinyl, etc.). However, at least one of $R_{11}$, $R_{12}$, $R_{13}$ and $R_{14}$ is dialkylamino-substituted aryl group. Particularly, the case when at least one of R11 and R12 and at least one of R13 and R14 are dialkylamino-substituted aryl groups are preferred. Also, the alkyl in the dialkylamino-substituted aryl group should preferably have 1 to 4 carbon atoms. $m_1$ is 0 or 1, $n_1$ is 0, 1 or 2. $X^{\ominus}$ represents anion such as chloride, bromide, iodide, perchlorate, nitrate, benzenesulfonate, p-toluenesulfonate, methylsulfate, ethylsulfate, propylsulfate, tetrafloroborate, tetraphenylborate, hexafluorophosphate, benzenesulfinate, acetate, trifluoroacetate, propionacetate, benzoate, oxalate, succinate, malonate, oleate, stearate, citrate, monohydrogen diphosphate, dihydrogen monophosphate, chlorosulfonate, pentachlorostannate, florosulfonate, trifloromethanesulfonate, hexafluoroarsenate, hexafluoroantimonate, molybdenate, tungstate, titanate, zirconate, etc.

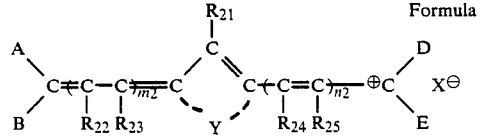

Formula [2-I]

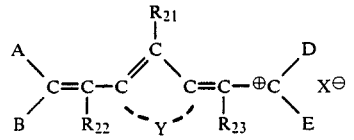

Formula [2-II]

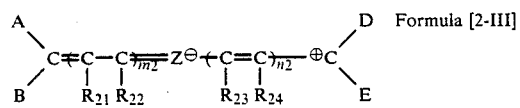

Formula [2-III]

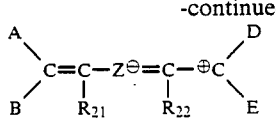

Formula [2-IV]

In the formulae, A, B, D and E represent hydrogen atom, halogen atom, or alkyl group (e.g. methyl, ethyl, n-propyl, iso-propyl, n-butyl, sec-butyl, iso-butyl, t-butyl, n-amyl, t-amyl, n-hexyl, n-octyl, t-octyl, etc.), further other alkyl groups such as substituted alkyl group (e.g. 2-hydroxyethyl, 3-hydroxypropyl, 4-hydroxybutyl, 2-acetoxyethyl, carboxymethyl, 2-carboxyethyl, 3-carboxypropyl, 2-sulfoethyl, 3-sulfopropyl, 4-sulfobutyl, 3-sulfatepropyl, 4-sulfatebutyl, N-(methylsulfonyl)carbamylmethyl, 3-(acetylsulfamyl)propyl, 4-(acetylsulfamyl)butyl, etc.), cyclic alkyl group (e.g. cyclohexyl, etc.), alkenyl group (vinyl, allyl, propenyl, butenyl, pentenyl, hexenyl, heptenyl, octenyl, dodecynyl, prenyl, etc.), aralkyl group (e.g. benzyl, phnethyl, α-naphtylmethyl, β-naphthylmethyl, etc., substituted aralkyl group (e.g. carboxybenzyl, sulfobenzyl, hydroxybenzyl, etc.). Further, A, B, D and E represent substituted or unsubstituted aryl group (e.g. phenyl, naphthyl, tolyl, xylyl, methoxyphenyl, dimethoxyphenyl, trimethoxyphenyl, ethoxyphenyl, dimethylaminophenyl, diethylaminophenyl, dipropylaminophenyl, di-n-butylaminophenyl, dibenzylaminophenyl, diphenylaminophenyl, etc.), substituted or unsubstituted heterocyclic group (e.g. pyridyl, quinolyl, lepidyl, methylpyridyl, furyl, thienyl, indolyl, pyrrole, carbazolyl, N-ethylcarbazolyl, etc.) or substituted or unsubstituted styryl group (e.g. styryl, methoxystyryl, dimethoxystyryl, trimethoxystyryl, ethoxystytyl, dimethylaminostyryl, diethylaminostyryl, dipropylaminostyryl, dibenzylaminostyryl, diphenylaminostyryl, 2,2-diphenylvinyl, 2-phenyl-2-methylvinyl, 2-(dimethylaminophenyl)-2-phenylvinyl, 2-(diethylaminophenyl)-2-phenylvinyl, 2-(dibenzylaminophenyl)-2-phenylvinyl, 2,2-di(diethylaminophenyl)vinyl,2,2-di(methoxyphenyl)vinyl, 2,2-di(ethoxyphenyl)vinyl, 2-(dimethylaminophenyl)-2-methylvinyl, 2-(diethylaminophenyl)-2-ethylvinyl, etc. However, at least one of A, B, D and E is dialkylamino-substituted aryl group. Particularly, the case when at least one of A and B and at least one of D and E are dialkylamino-substituted aryl groups are preferred.

Also, the alkyl in the dialkylamino-substituted aryl group should preferably have 1 to 4 carbon atoms.

$R_{21}$, $R_{22}$, $R_{23}$, $R_{24}$ and $R_{25}$ may include hydrogen atom, halogen atom, alkyl group (e.g. methyl, ethyl, n-propyl, iso-propyl, n-butyl, sec-butyl, iso-butyl, t-butyl, n-amyl-, t-amyl, n-hexyl, n-octyl, t-octyl, etc.), further other alkyl groups such as substituted alkyl group (e.g. 2-hydroxyethyl, 3-hydroxypropyl, 4-hydroxybutyl, 2-acetoxyethyl, carboxymethyl, 2-carboxyethyl, 3-carboxypropyl, 2-sulfoethyl, 3-sulfopropyl, 4-sulfobutyl, 3-sulfatepropyl, 4-sulfatebutyl, N-(methylsulfonyl)carbamylmethyl, 3-(acetylsulfamyl)propyl, 4-(acetylsulfamyl)butyl, etc.), cyclic alkyl group (e.g. cyclohexyl, etc.), alkenyl group (vinyl, allyl, propenyl, butenyl, pentenyl, hexenyl, heptenyl, octenyl, dodecynyl, prenyl, etc.), aralkyl group (e.g. benzyl, phenethyl, α-naphtylmethyl, β-naphthylmethyl, etc.), substituted aralkyl group (e.g. carboxybenzyl, sulfobenzyl, hydroxybenzyl, etc.). $m_2$ and $n_2$ are each 0, 1 or 2.

Y represents a divalent hydrocarbon group for forming a substituted or unsubstituted 5-membered or 6-membered ring (e.g. —CH$_2$—CH$_2$—, —(CH$_2$)$_3$—,

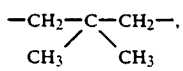

—CH=CH—, —CH$_2$—CHCl—CH$_2$—, etc.) and these 5-membered or 6-membered rings may be fused with benzene ring, naphthalene ring, etc.

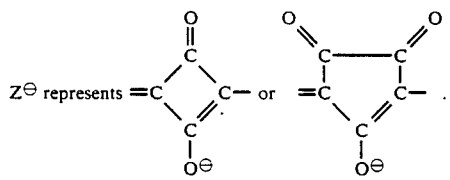

X$^\ominus$ may include the same as mentioned above.

In the combination of the polymethine compound (D) with the aminium salt (A) or the diimonium salt (I), when comparison is made between the group of polymethine compounds having dialkyl-substituted amino group at the terminal aryl group of the polymethine chain (DS group) and the group of polymethine compounds having no dialkyl-substituted amino group in all the aryl groups at both terminal aryl groups of the polymethine chain (DN group), difference in resistance to light stability can be shown.

The DS group having dialkyl-substituted amino group has been found to be higher in light stability resistance, particularly smaller in lowering of reflectance, than the DN group having hydrogen atom, halogen, alkoxy group, etc. as the substituent on the terminal aryl group. This may be considered to be due to similarity in structure to the polymethine compound, because the aminium salt or the diimonium salt is a p-phenylenediamine (or 4,4'-diaminodiphenyl) substituted with an aryl group having dialkyl-substituted amino group. The polymethine compound of the present invention may be considered to have the cationic center non-localized, including the polymethine chain and the aryl group conjugated therewith. Also, the aminium salt or the diimonium salt of the present invention is one-electron oxidized product or two-electron oxidized product, both being cationic species, and the cationic center is considered to be non-localized.

Particularly, when the DS group is compared with the DN group, DS group has dialkyl-substituted amino group on the aryl group, having many similarities in structure to the aminium salt or the diimonium salt of the present invention. On the other hand, because the DN group has no dialkyl-substituted amino group on the aryl group, it has little similarity in structure to the aminium salt or the diimonium salt.

Generally speaking, compounds with similar structures are well compatible and strong in interaction with each other, as important features in chemical properties. This has been said to be due to co-operative actions in orientation, compatibility, reactivity through the spacial interaction and the electronic interaction mutually between the compounds similar to each other. Perhaps, in the case of the present invention, the polymethine compound may be considered to interact strongly with the aminium salt or the diimonium salt through the above two actions and, in the optical recording layer comprising the polymethine compound and the aminium salt or the diimonium salt, the aminium salt or the diimonium salt may be estimated to act effectively on the excited species of the polymethine compound formed by absorption of light. This is because the aminium salt or the diimonium salt is considered to extinguish the excited species through the spacial and/or electronic interaction concerning consumption of excessive energy possessed by the excited species.

In the following, representative examples of the polymethine compounds represented by the above formula [1-I] are enumerated.

| Compound No. | Example of Compound |
| --- | --- |
| D-1 | ![structure with (C$_2$H$_5$)$_2$N groups, C—CH=CH—CH=C, ClO$_4^\ominus$] |
| D-2 | ![structure with (C$_2$H$_5$)$_2$N groups, C(CH=CH)$_2$CH=C, I$^\ominus$] |
| D-3 | ![(C$_2$H$_5$)$_2$N—C$_6$H$_4$—CH=CH—CH—CH=CH—C$_6$H$_4$—N(C$_2$H$_5$)$_2$, ClO$_4^\ominus$] |

-continued
| Compound No. | Example of Compound |
|---|---|
| D-4 | 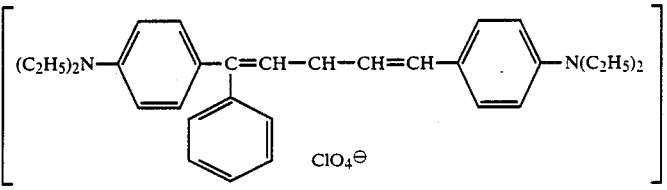 |
| D-5 | 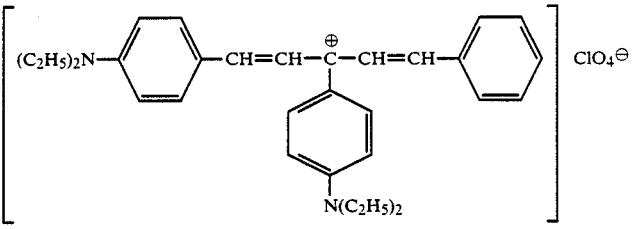 |
| D-6 | 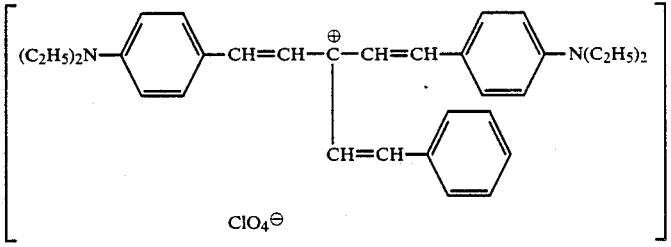 |
| D-7 | 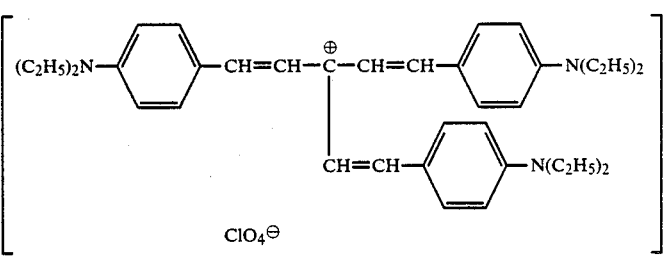 |
| D-8 | 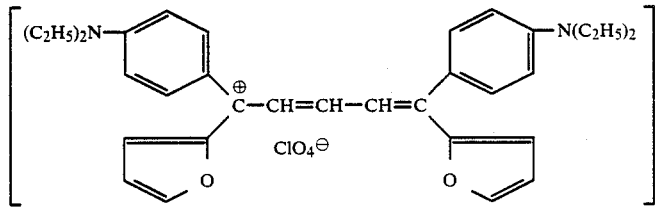 |
| D-9 | 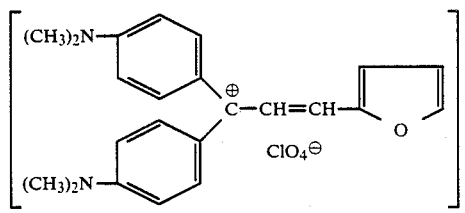 |

-continued

| Compound No. | Example of Compound |
|---|---|
| D-10 | $[(CH_3)_2N-C_6H_4)_2\overset{\oplus}{C}-CH=CH-C_6H_4-N(CH_3)_2]\ ClO_4^{\ominus}$ |
| D-11 | $[(CH_3)_2N-C_6H_4-\overset{CH_3}{\underset{CH_3}{\overset{\oplus}{C}}}-CH=\overset{CH_3}{\underset{C_6H_4-N(C_2H_5)_2}{C}}]\ ClO_4^{\ominus}$ |
| D-12 | (bis[4-(N-ethyl-N-hydroxyethylamino)phenyl] / bis[4-(di-n-butylamino)phenyl] pentamethine cation, $ClO_4^{\ominus}$) |
| D-13 | $[(C_2H_5)_2N-C_6H_4)(C_6H_{11})\overset{\oplus}{C}-CH=CH-CH=C(C_6H_{11})(C_6H_4-N(C_2H_5)_2)]\ ClO_4^{\ominus}$ |
| D-14 | (complex structure with four $(C_2H_5)_2N-C_6H_4-$ groups, $ClO_4^{\ominus}$) |

| Compound No. | Example of Compound |
|---|---|
| D-15 | 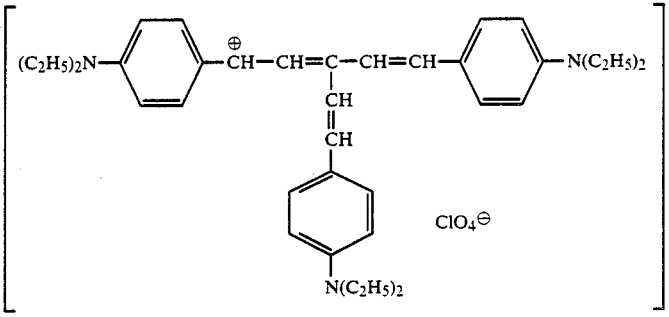 |
| D-16 | 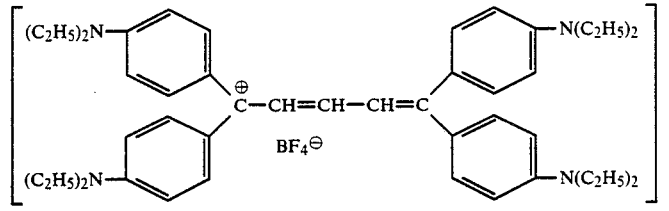 |
| D-17 | 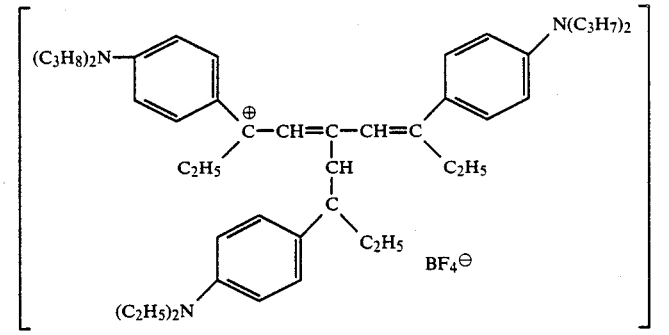 |
| D-18 | 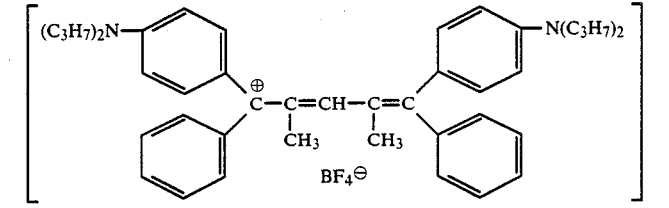 |
| D-19 | 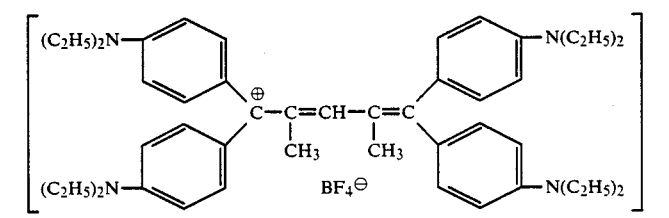 |
| D-20 | 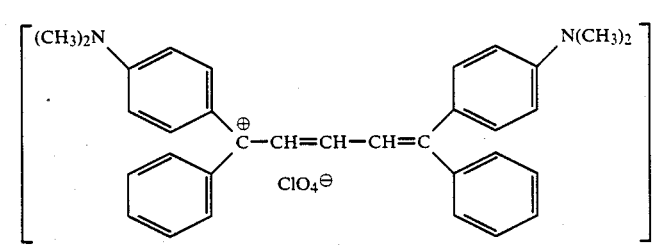 |

-continued

| Compound No. | Example of Compound |
|---|---|

D-21

$$\left[ (C_2H_5)_2N-\phantom{X}\overset{\phantom{X}}{\underset{C_6H_5}{\bigcirc}}\phantom{X}\overset{\oplus}{C}-CH=CH-CH=\underset{C_6H_5}{\overset{\phantom{X}}{C}}-\phantom{X}\overset{\phantom{X}}{\bigcirc}-N(C_2H_5)_2 \right] ClO_4^{\ominus}$$

D-22

$$\left[ (CH_3)_2N-\bigcirc-\overset{\oplus}{\underset{\underset{Cl}{\bigcirc}}{C}}-CH=CH-CH=\underset{\underset{Cl}{\bigcirc}}{C}-\bigcirc-N(CH_3)_2 \right] ClO_4^{\ominus}$$

D-23

$$\left[ (C_2H_5)_2N-\bigcirc-\overset{\oplus}{\underset{\underset{Cl}{\underset{Cl}{\bigcirc}}}{C}}-CH=CH-CH=\underset{\underset{Cl}{\underset{Cl}{\bigcirc}}}{C}-\bigcirc-N(C_2H_5)_2 \right] I^{\ominus}$$

D-24

$$\left[ (C_2H_5)_2N-\bigcirc-\overset{\oplus}{\underset{\underset{OC_2H_5}{\bigcirc}}{C}}-CH=CH-CH=\underset{\underset{OC_2H_5}{\bigcirc}}{C}-\bigcirc-N(C_2H_5)_2 \right] ClO_4^{\ominus}$$

D-25

$$\left[ (C_2H_5)_2N-\bigcirc-\overset{\oplus}{\underset{C_6H_5}{C}}-CH=\underset{C_6H_5}{C}-\bigcirc-N(C_2H_5)_2 \right] I^{\ominus}$$

| Compound No. | Example of Compound |
|---|---|
| D-26 | 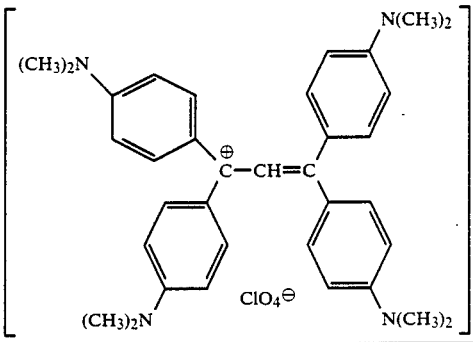 |

Next, representative examples of cyclic polymethine compounds (D) represented by the above formulae [2-I], [2-II], [2-III] and [2-IV] are enumerated.

In these compound examples,

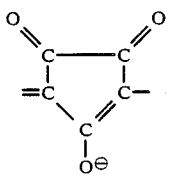

is represented by $Z_1$ and

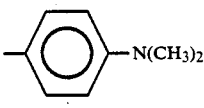

by $Z_2$. And ← means the same substituent as that on the left.

| Compound No. | Formula No. | A | D | B | E | $R_{21}$ |
|---|---|---|---|---|---|---|
| D-27 | 2-I | 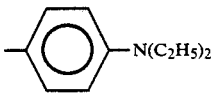 —N(CH₃)₂ | ← | ← | ← | H |
| D-28 | 2-I | 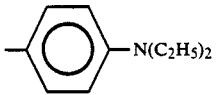 —N(C₂H₅)₂ | ← | ← | ← | Cl |
| D-29 | 2-I | 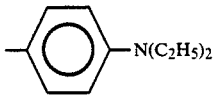 —N(C₂H₅)₂ | ← | H | ← | H |
| D-30 | 2-I | 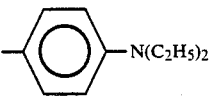 —N(C₂H₅)₂ | ← | ← | ← | H |
| D-31 | 2-I | 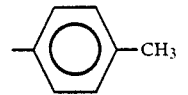 —N(C₂H₅)₂ | ← | 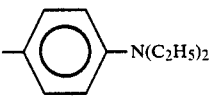 —CH₃ | ← | Cl |
| D-32 | 2-I | 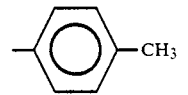 —N(C₂H₅)₂ | ← | 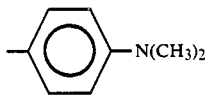 —CH₃ | ← | H |
| D-33 | 2-I | 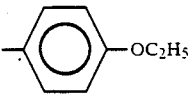 —N(CH₃)₂ | ← | —◯—OC₂H₅ | ← | H |

| | | | | | |
|---|---|---|---|---|---|
| D-34 | 2-I | 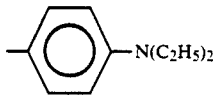 | ← | 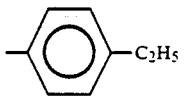 | ← | H |
| D-35 | 2-I | 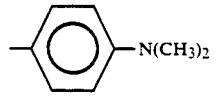 | ← | —CH₃ | ← | Cl |
| D-36 | 2-I | 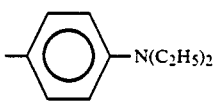 | ← | —CH₃ | ← | H |
| D-37 | 2-I | 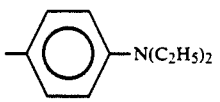 | ← | —CH₃ | ← | Cl |
| D-38 | 2-I | 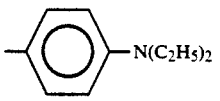 | ← | ← | ← | H |
| D-39 | 2-I | 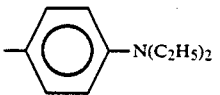 | ← | ← | ← | CH₃ |
| D-40 | 2-I | 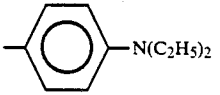 | ← | ← | ← | H |
| D-41 | 2-I | 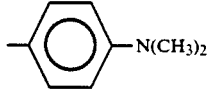 | ← | 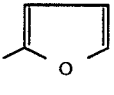 | ← | H |
| D-42 | 2-I | 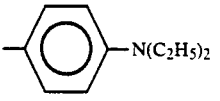 | ← | ← | ← | CH₃ |
| D-43 | 2-II | 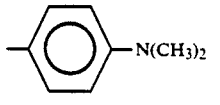 | ← | ← | ← | Cl |
| D-44 | 2-II | 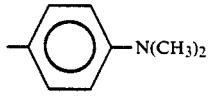 | ← | ← | ← | H |
| D-45 | 2-II | 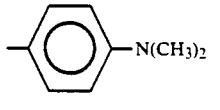 | ← | ← | ← | H |
| D-46 | 2-II | 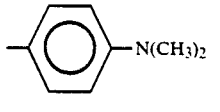 | ← | 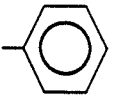 | ← | Cl |

-continued

| | | | | | | |
|---|---|---|---|---|---|---|
| D-47 | 2-II | 4-N(CH$_3$)$_2$-C$_6$H$_4$- | ← | 4-CH$_3$-C$_6$H$_4$- | ← | H |
| D-48 | 2-II | 4-N(CH$_3$)$_2$-C$_6$H$_4$- | ← | 4-OC$_2$H$_5$-C$_6$H$_4$- | ← | Cl |
| D-49 | 2-II | 4-N(CH$_3$)$_2$-C$_6$H$_4$- | ← | 4-Cl-C$_6$H$_4$- | ← | H |
| D-50 | 2-II | 4-N(C$_2$H$_5$)$_2$-C$_6$H$_4$- | ← | ← | ← | H |
| D-51 | 2-II | 4-N(C$_2$H$_5$)$_2$-C$_6$H$_4$- | ← | ← | ← | Cl |
| D-52 | 2-II | 4-N(C$_2$H$_5$)$_2$-C$_6$H$_4$- | ← | H | ← | Br |
| D-53 | 2-II | 4-N(C$_2$H$_5$)$_2$-C$_6$H$_4$- | ← | C$_6$H$_5$- | ← | Cl |
| D-54 | 2-II | 4-N(C$_2$H$_5$)$_2$-C$_6$H$_4$- | ← | 4-C$_2$H$_5$-C$_6$H$_4$- | ← | H |
| D-55 | 2-II | 4-N(C$_2$H$_5$)$_2$-C$_6$H$_4$- | ← | 3,4-(CH$_3$)$_2$-C$_6$H$_3$- | ← | Br |
| D-56 | 2-II | 4-N(C$_2$H$_5$)$_2$-C$_6$H$_4$- | ← | 4-OC$_2$H$_5$-C$_6$H$_4$- | ← | H |
| D-57 | 2-II | 4-N(C$_2$H$_5$)$_2$-C$_6$H$_4$- | ← | 2-pyridyl | ← | Br |
| D-58 | 2-II | 4-N(C$_2$H$_5$)$_2$-C$_6$H$_4$- | ← | CH$_3$ | ← | H |
| D-59 | 2-II | 4-N(C$_2$H$_5$)$_2$-C$_6$H$_4$- | ← | 4-Cl-C$_6$H$_4$- | ← | Cl |

-continued
| | | | | | | |
|---|---|---|---|---|---|---|
| D-60 | 2-II | 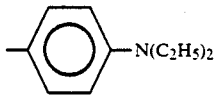 | ← | 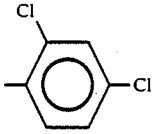 | ← | H |
| D-61 | 2-II | 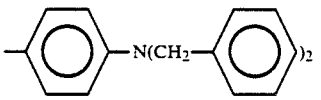 | ← | 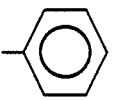 | ← | Cl |
| D-62 | 2-II | 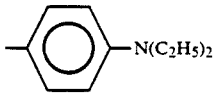 | ← | ← | 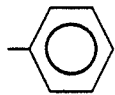 | Br |
| D-63 | 2-II | 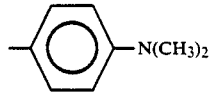 | 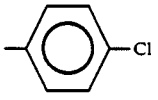 | 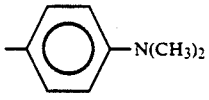 | 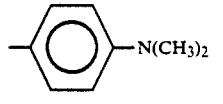 | Cl |
| D-64 | 2-III | 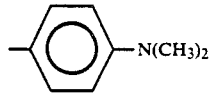 | ← | ← | ← | — |
| D-65 | 2-III | 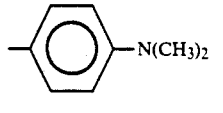 | ← | ← | ← | H |
| D-66 | 2-III | 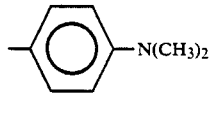 | ← | — | ← | H |
| D-67 | 2-III | 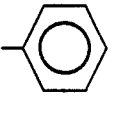 | ← | 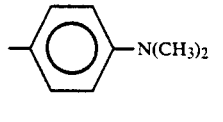 | ← | — |
| D-68 | 2-III | 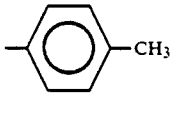 | ← | 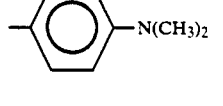 | ← | H |
| D-69 | 2-III | 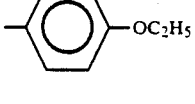 | ← | 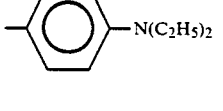 | ← | — |
| D-70 | 2-III | 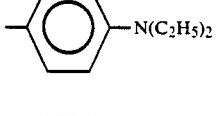 | ← | ← | ← | — |
| D-71 | 2-III | 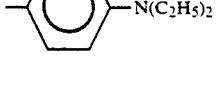 | ← | ← | ← | H |
| D-72 | 2-III |  | ← |  | ← | H |

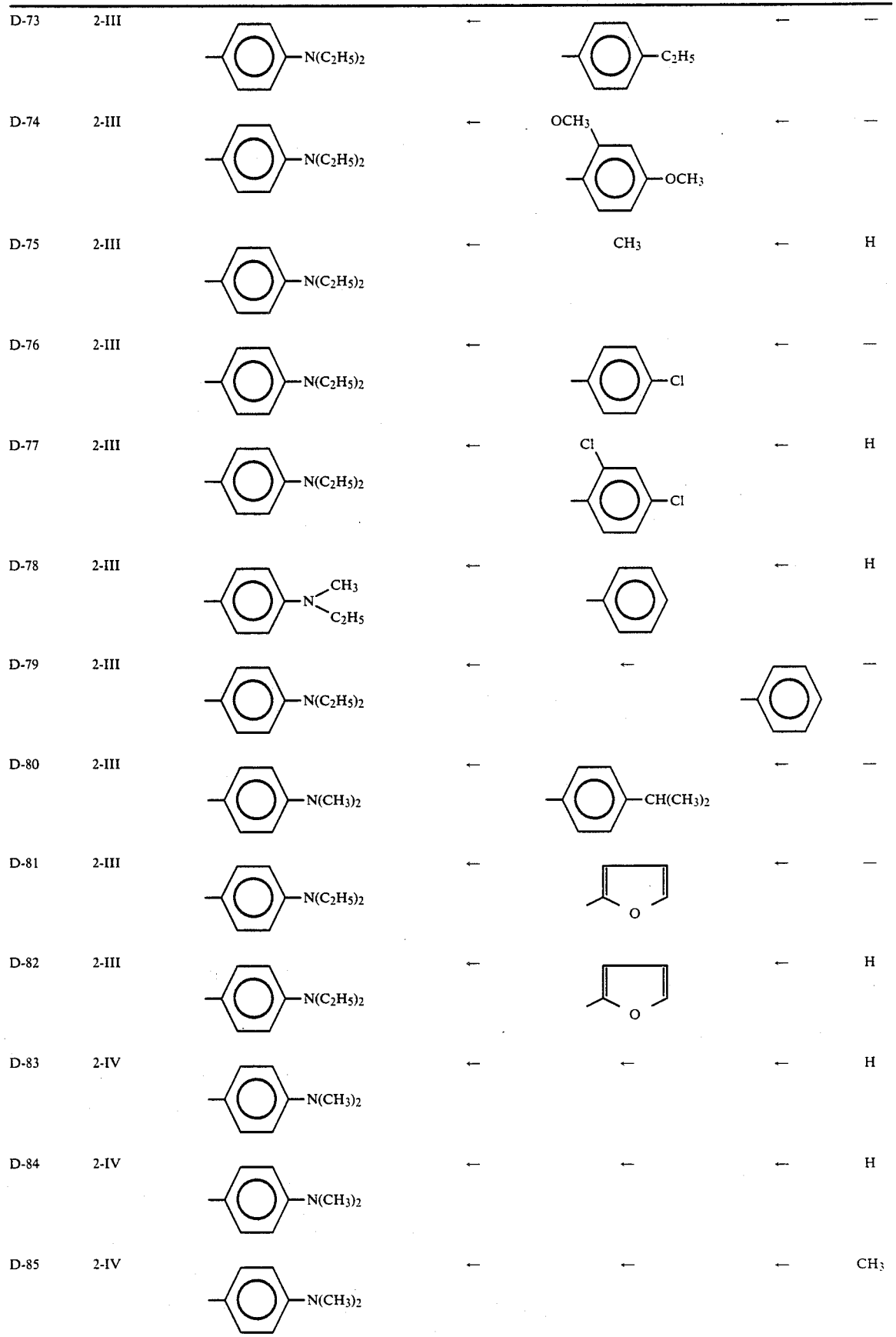

-continued
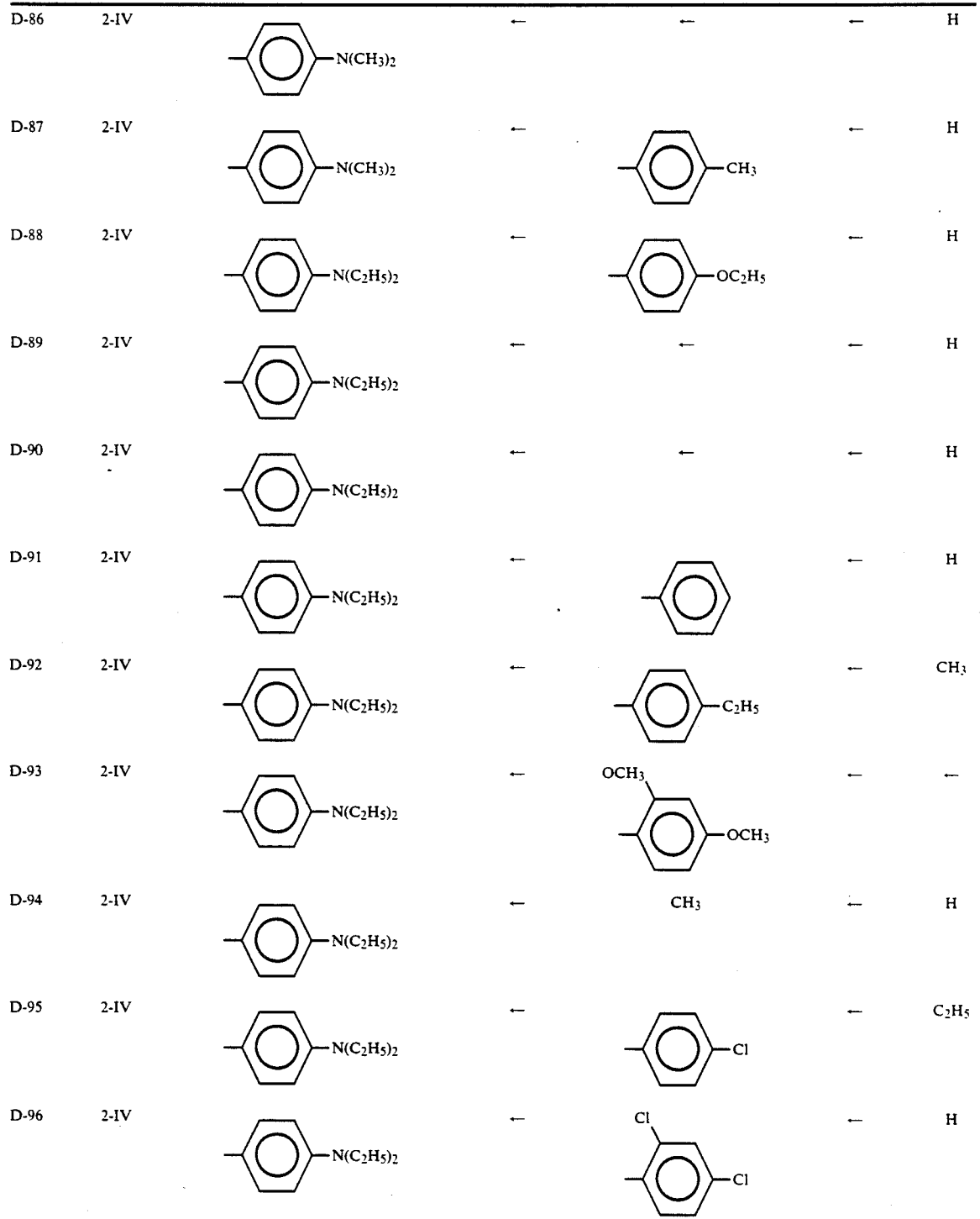
| Compound No. | Formula No. | $R_{22}$ | $R_{24}$ | $R_{23}$ | $R_{25}$ | $m_2$ | $n_2$ | Y | Z | X |
|---|---|---|---|---|---|---|---|---|---|---|
| D-27 | 2-I | — | — | — | — | 0 | 0 | $(CH_2)_3$ | — | $ClO_4$ |
| D-28 | 2-I | — | — | — | — | 0 | 0 | $(CH_2)_2$ | — | $ClO_4$ |
| D-29 | 2-I | — | — | — | — | 0 | 0 | $(CH_2)_2$ | — | $ClO_4$ |
| D-30 | 2-I | — | — | — | — | 0 | 0 | 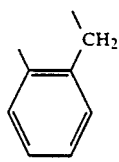 | — | $BF_4$ |

-continued

| | | | | | | | | | |
|---|---|---|---|---|---|---|---|---|---|
| D-31 | 2-I | — | — | — | — | 0 | 0 | ⁺(CH₂)₃ | — | ClO₄ |
| D-32 | 2-I | — | — | — | — | 0 | 0 | ⁺(CH₂)₃ | — | BF₄ |
| D-33 | 2-I | — | — | — | — | 0 | 0 | ⁺(CH₂)₂ | — | ClO₄ |
| D-34 | 2-I | — | — | — | — | 0 | 0 | ⁺(CH₂)₂ | — | ClO₄ |
| D-35 | 2-I | H | ← | ← | ← | 1 | 1 | ⁺(CH₂)₂ | — | ClO₄ |
| D-36 | 2-I | ← | — | H | — | 1 | 0 | ⁺(CH₂)₂ | — | SO₃-C₆H₄-CH₃ |
| D-37 | 2-I | ← | — | H | — | 1 | 0 | ⁺(CH₂)₂ | — | ClO₄ |
| D-38 | 2-I | — | — | — | — | 0 | 0 | -CH₂-C(CH₃)₂-CH₂- | — | ClO₄ |
| D-39 | 2-I | — | — | — | — | 0 | 0 | ⁺(CH₂)₂ | — | ClO₄ |
| D-40 | 2-I | ← | — | H | — | 2 | 0 | ⁺(CH₂)₂ | — | ClO₄ |
| D-41 | 2-I | — | — | — | — | 0 | 0 | ⁺(CH₂)₂ | — | ClO₄ |
| D-42 | 2-I | H | — | H | — | 2 | 0 | ⁺(CH₂)₂ | — | ClO₄ |
| D-43 | 2-II | H | — | H | — | — | — | ⁺(CH₂)₃ | — | ClO₄ |
| D-44 | 2-II | CH₃ | — | CH₃ | — | — | — | -CH₂-C(CH₃)₂-CH₂- | — | ClO₄ |
| D-45 | 2-II | ← | — | H | — | — | — | -CH₂-(o-CH₃-C₆H₄) | — | I |
| D-46 | 2-II | H | — | H | — | — | — | ⁺(CH₂)₃ | — | BF₄ |
| D-47 | 2-II | CH₃ | — | CH₃ | — | — | — | ⁺(CH₂)₂ | — | SO₃-C₆H₄-CH₃ |
| D-48 | 2-II | H | — | H | — | — | — | ⁺(CH₂)₃ | — | ClO₄ |
| D-49 | 2-II | Cl | — | Cl | — | — | — | -CH₂-C(CH₃)₂-CH₂- | — | ClO₄ |
| D-50 | 2-II | H | — | H | — | — | — | -CH₂-C(CH₃)₂-CH₂- | — | ClO₄ |
| D-51 | 2-II | H | — | H | — | — | — | ⁺(CH₂)₃ | — | ClO₄ |
| D-52 | 2-II | H | — | H | — | — | — | ⁺(CH₂)₂ | — | I |
| D-53 | 2-II | Cl | — | Cl | — | — | — | -CH₂-(o-CH₃-C₆H₄) | —BF₄ | |
| D-54 | 2-II | H | — | H | — | — | — | ⁺(CH₂)₃ | — | ClO₄ |
| D-55 | 2-II | Br | — | Br | — | — | — | ⁺(CH₂)₂ | — | SO₃-C₆H₄-CH₃ |

-continued

| Compound No. | Formula No. | R | | R | | | | Y | | X |
|---|---|---|---|---|---|---|---|---|---|---|
| D-56 | 2-II | H | — | H | — | — | — | —CH₂—C(CH₃)(CH₃)—CH₂— | — | ClO₄ |
| D-57 | 2-II | CH₃ | — | CH₃ | — | — | — | ${+CH_2+}_2$ | — | 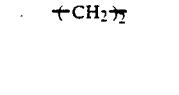 SO₃—C₆H₄—CH₃ |
| D-58 | 2-II | H | — | H | — | — | — | 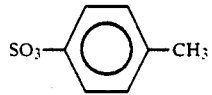 benzyl | — | BF₄ |
| D-59 | 2-II | H | — | H | — | — | — | ${+CH_2+}_2$ | — | ClO₄ |
| D-60 | 2-II | H | — | H | — | — | — | —CH₂—C(CH₃)(CH₃)—CH₂— | — | ClO₄ |
| D-61 | 2-II | H | — | H | — | — | — | ${+CH_2+}_2$ | — | I |
| D-62 | 2-II | Br | — | Br | — | — | — | ${+CH_2+}_3$ | — | I |
| D-63 | 2-II | H | — | H | — | — | — | —CH₂—C(CH₃)(CH₃)—CH₂— | — | BF₄ |
| D-64 | 2-III | — | — | — | — | 0 | 0 | — | $Z_1$ | — |
| D-65 | 2-III | ← | ← | ← | — | 1 | 1 | — | $Z_1$ | — |
| D-66 | 2-III | CH₃ | H | CH₃ | — | 2 | 2 | — | $Z_2$ | — |
| D-67 | 2-III | — | — | — | — | 0 | 0 | — | $Z_1$ | — |

| Compound No. | Formula No. | $R_{22}$ | $R_{24}$ | $R_{23}$ | $R_{25}$ | m | n | Y | Z | X |
|---|---|---|---|---|---|---|---|---|---|---|
| D-68 | 2-III | ← | ← | ← | — | 1 | 1 | — | $Z_2$ | — |
| D-69 | 2-III | — | — | — | — | 0 | 0 | — | $Z_2$ | — |
| D-70 | 2-III | — | — | — | — | 0 | 0 | — | $Z_1$ | — |
| D-71 | 2-III | ← | ← | ← | — | 1 | 1 | — | $Z_2$ | — |
| D-72 | 2-III | ← | ← | ← | — | 1 | 1 | — | $Z_1$ | — |
| D-73 | 2-III | — | — | — | — | 0 | 0 | — | $Z_2$ | — |
| D-74 | 2-III | — | — | — | — | 0 | 0 | — | $Z_2$ | — |
| D-75 | 2-III | Cl | H | Cl | — | 1 | 1 | — | $Z_1$ | — |
| D-76 | 2-III | — | — | — | — | 0 | 0 | — | $Z_1$ | — |
| D-77 | 2-III | ← | ← | ← | — | 1 | 1 | — | $Z_2$ | — |

| Compound No. | Formula No. | $R_{22}$ | $R_{24}$ | $R_{23}$ | $R_{25}$ | $m_2$ | $n_2$ | Y | Z | X |
|---|---|---|---|---|---|---|---|---|---|---|
| D-78 | 2-III | ← | ← | ← | — | 1 | 1 | — | $Z_2$ | — |
| D-79 | 2-III | — | — | — | — | 0 | 0 | — | $Z_1$ | — |
| D-80 | 2-III | — | — | — | — | 0 | 0 | — | $Z_1$ | — |
| D-81 | 2-III | — | — | — | — | 0 | 0 | — | $Z_1$ | — |
| D-82 | 2-III | ← | ← | ← | — | 1 | 1 | — | $Z_1$ | — |
| D-83 | 2-IV | ← | — | — | — | 0 | 0 | — | $Z_1$ | — |
| D-84 | 2-IV | ← | — | — | — | 0 | 0 | — | $Z_1$ | — |
| D-85 | 2-IV | ← | — | — | — | 0 | 0 | — | $Z_2$ | — |
| D-86 | 2-IV | ← | — | — | — | — | — | — | $Z_1$ | — |
| D-87 | 2-IV | ← | — | — | — | — | — | — | $Z_2$ | — |
| D-88 | 2-IV | ← | — | — | — | — | — | — | $Z_2$ | — |
| D-89 | 2-IV | ← | — | — | — | — | — | — | $Z_1$ | — |
| D-90 | 2-IV | ← | — | — | — | — | — | — | $Z_1$ | — |
| D-91 | 2-IV | ← | — | — | — | — | — | — | $Z_1$ | — |
| D-92 | 2-IV | ← | — | — | — | — | — | — | $Z_1$ | — |
| D-93 | 2-IV | ← | — | — | — | — | — | — | $Z_2$ | — |
| D-94 | 2-IV | Cl | — | — | — | — | — | — | $Z_1$ | — |
| D-95 | 2-IV | ← | — | — | — | — | — | — | $Z_1$ | — |
| D-96 | 2-IV | ← | — | — | — | — | — | — | $Z_2$ | — |

These polymethine compounds can be obtained easily by synthesis according to the synthetic methods disclosed in Bernard S. wildi et al, J. Am. Chem. Soc. (Journal of American Chemical Society) 80, 3772–3777 (1959), H. Schmidt et al, Ann. (Liebig Annalen der Chemie) 623, 204-216 or R. Wlzinger et al, Helv. Chm, Acta (Helvetica Chica Acta) 24, 369, etc.

Such dyes have absorption peaks with great absorption coefficients in the near infrared region, have also good solubility in organic solvents and can give good characteristics as optical recording medium. Further, it has been found that recording reproduction characteristic and storage stability can be improved by incorporation of an aminium salt compound or a diimonium salt compound in the cyclic polymethine compound as described above.

The aminium salt compound and the diimonium salt compound to be used in the present invention are represented by the formula [3] and the formula [4] shown below, respectively.

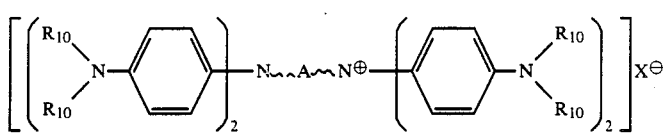
Formula [3]

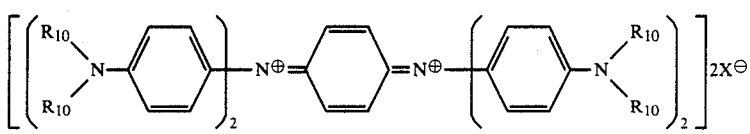
Formula [4]

In the formula, $R_{10}$'s may be either the same or different, and represent hydrogen atom or an alkyl group (e.g. methyl, ethyl, n-propyl, iso-propyl, n-butyl, sec-butyl, iso-butyl, t-butyl, n-amyl, t-amyl, n-hexyl, n-octyl, t-octyl and $C_9-C_{12}$ alkyl groups), further other alkyl group, for example, substituted alkyl group (e.g. 2-hydroxyethyl, 3-hydroxypropyl, 4-hydroxybutyl, 2-acetoxyethyl, carboxymethyl, 2-carboxyethyl, 3-carboxypropyl, 2-sulfoethyl, 3-sulfopropyl, 4-sulfobutyl, 3-sulfatepropyl, 4-sulfatebutyl, N-(methylsulfonyl)-carbamylmethyl, 3-(acetylsulfamyl)propyl, 4-(acetylsulfamyl)butyl, etc.), cyclic alkyl group (e.g. cyclohexyl, etc.) an alkenyl group (vinyl, allyl, propenyl, butenyl, pentenyl, hexenyl, heptenyl, octenyl, dodecenyl, prenyl, etc.), an aralkyl group (e.g. benzyl, phenethyl, α-naphthlmethyl, β-naphthylmethyl, etc.), and a substituted aralkyl group (e.g. carboxybenzyl, sulfobenzyl, hydroxybenzyl, etc.).

The aminium salt compound or diimonium salt compound represented by the following formula (5) or (6) to be used in the present invention is an IR-ray absorptive compound, particularly improved in light resistance and repeated reproduction durability and having better solubility in solvents as compared with those of the prior art, and an optical recording medium having light resistance, repeated reproduction durability as well as excellent productivity can be obtained.

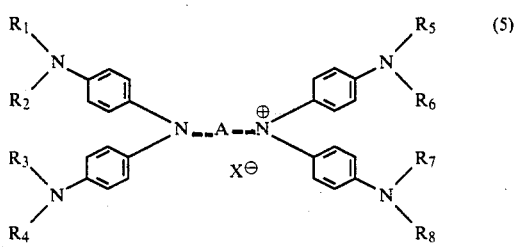
(5)

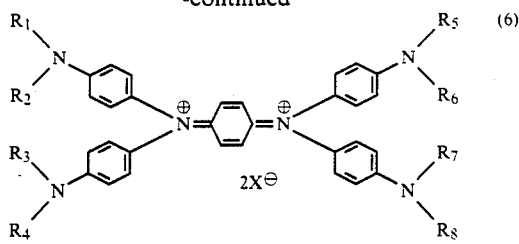
(6)

Here, A represents

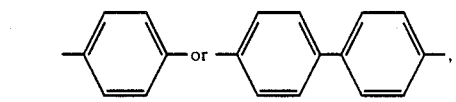

and these may be substituted with alkyl, halogen or alkoxy. $X^{\ominus}$ represents an anion.

$R_1$ through $R_8$ are substituents having 1 to 8 carbon atoms, and at least one of them is an alkoxyalkyl group, an alkenyl group or an alkynyl group.

$X^{\ominus}$ represents an anion such as chloride, bromide, iodide, perchlorate, nitrate, benzenesulfonate, p-toluenesulfonate, methylsulfate, ethylsulfate, propylsulfate, tetrafluoroborate, tetraphenylborate, hexafluorophosphate, benzenesulfinate, acetate, trifluoroacetate, propionacetate, benzoate, oxalate, succinate, malonate, oleate, stearate, citrate, monohydrogen diphosphate, dihydrogen monophosphate, pentachlorostannate, chlorosulfonate, fluorosulfonate, trifluoromethansulfonate, hexafluoroarsenate, hexafluoroantimonate, molybdate, tungstate, titanate, zirconate ions, etc.

The substituents of $R_1$ through $R_8$ are straight or branched alkyl groups which may be either the same or different, and at least one of them is an alkoxyalkyl group, an alkenyl group or an alkynyl group.

The compound of the present invention can be produced by utilizing the methods disclosed in U.S. Pat. Nos. 3,251,881, 3,575,871, 3,484,467 and Japanese Laid-open Patent Publication No. 61-69991. For example, it can be produced according to the following process:

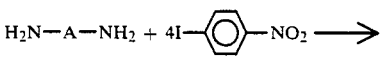

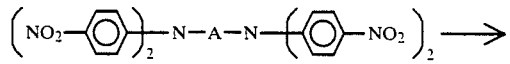

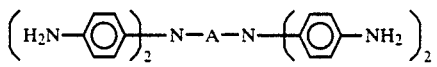

The amino derivative obtained by the above Ulman reaction and reduction reaction can be alkylated, alkenylated or alkynylated by selective substitution, followed by oxidation reaction to obtain the final product.

The IR-ray absorptive compound according to the present invention has an alkoxyl group, an alkenyl group or an alkynyl group in the structure and is also excellent in solubility in solvents, perhaps due to the polarity of those groups.

Examples of the alkoxyalkyl group may include straight or branched alkoxyalkyls such as methoxymethyl, 2-methoxyethyl, 3-methoxypropyl, 2-methoxypropyl, 4-methoxybutyl, 3-methoxybutyl, 2-methoxybutyl, 5-methoxypentyl, 4-methoxypentyl, 3-methoxypentyl, 2-methoxypentyl, 6-methoxyhexyl, ethoxymethyl, 2-ethoxyethyl, 3-ethoxypropyl, 2-ethoxypropyl, 4-ethoxybutyl, 3-ethoxybutyl, 5-ethoxypentyl, 4-ethoxypentyl, 6-ethoxyhexyl, propoxymethyl, 2-propoxyethyl, 3-propoxypropyl, 4-propoxybutyl, 5-propoxypentyl and the like.

Examples of the alkenyl group may include straight or branched alkenyls such as allyl, butenyl, pentenyl, hexenyl, heptenyl, octenyl, methacryl, pentadienyl, hexadienyl and the like.

Examples of the alkynyl group may include propargyl, 3-butynyl, 4-pentynyl, 5-hexynyl and the like.

In the following, representative examples of the aminium salt compound (A) shown by the above formula [3] are enumerated.

| Compound No. | A | $R_{10}$ | $X^{\ominus}$ |
|---|---|---|---|
| A-1 | —⟨phenyl⟩— | $CH_3$ | $AsF_6^{\ominus}$ |
| A-2 | —⟨phenyl⟩— | $CH_3$ | $ClO_4^{\ominus}$ |
| A-3 | —⟨phenyl⟩— | $CH_3$ | $SbF_6^{\ominus}$ |
| A-4 | —⟨phenyl⟩— | $C_2H_5$ | $AsF_6^{\ominus}$ |
| A-5 | —⟨phenyl⟩— | $C_2H_5$ | $ClO_4^{\ominus}$ |
| A-6 | —⟨phenyl⟩— | $C_2H_5$ | $BF_4^{\ominus}$ |
| A-7 | —⟨phenyl⟩— | $n-C_3H_7$ | $AsF_6^{\ominus}$ |
| A-8 | —⟨phenyl⟩— | $iso-C_3H_7$ | $ClO_4^{\ominus}$ |
| A-9 | —⟨phenyl⟩— | $n-C_4H_9$ | $ClO_4^{\ominus}$ |
| A-10 | —⟨phenyl⟩— | $n-C_4H_9$ | $AsF_6^{\ominus}$ |
| A-11 | —⟨phenyl⟩— | $n-C_4H_9$ | $SbF_6^{\ominus}$ |
| A-12 | —⟨phenyl⟩— | $n-C_4H_9$ | $BF_4^{\ominus}$ |
| A-13 | —⟨phenyl⟩— | $n-C_4H_9$ | $I^{\ominus}$ |
| A-14 | —⟨phenyl⟩— | $n-C_4H_9$ | $CH_3-⟨phenyl⟩-SO_3^{\ominus}$ |
| A-15 | —⟨phenyl⟩— | $t-C_4H_9$ | $ClO_4^{\ominus}$ |
| A-16 | —⟨phenyl⟩— | $t-C_4H_9$ | $AsF_6^{\ominus}$ |
| A-17 | —⟨phenyl⟩— | $n-C_6H_{13}$ | $ClO_4^{\ominus}$ |
| A-18 | —⟨phenyl⟩— | $n-C_8H_{17}$ | $AsF_6^{\ominus}$ |
| A-19 | —⟨phenyl⟩— | $n-C_{12}H_{25}$ | $SbF_6^{\ominus}$ |
| A-20 | —⟨biphenyl⟩— | $CH_3$ | $AsF_6^{\ominus}$ |
| A-21 | —⟨biphenyl⟩— | $C_2H_5$ | $ClO_4^{\ominus}$ |
| A-22 | —⟨biphenyl⟩— | $C_2H_5$ | $AsF_6^{\ominus}$ |
| A-23 | —⟨biphenyl⟩— | $C_2H_5$ | $SbF_6^{\ominus}$ |
| A-24 | —⟨phenyl⟩— | $C_2H_4OH$ | $SbF_6^{\ominus}$ |
| A-25 | —⟨phenyl⟩— | $C_2H_4OH$ | $ClO_4^{\ominus}$ |
| A-26 | —⟨phenyl⟩— | $C_2H_4OH$ | $NO_3^{\ominus}$ |
| A-27 | —⟨biphenyl⟩— | $C_2H_4OH$ | $SbF_6^{\ominus}$ |

In the following, representative examples of the diimonium salt compound (I) shown by the above formula [4] are enumerated.

| Compound No. | R_{10} | $X^\ominus$ |
|---|---|---|
| I-1 | $CH_3$ | $AsF_6^\ominus$ |
| I-2 | $CH_3$ | $ClO_4^\ominus$ |
| I-3 | $CH_3$ | $SbF_6^\ominus$ |
| I-4 | $C_2H_5$ | $AsF_6^\ominus$ |
| I-5 | $C_2H_5$ | $ClO_4^\ominus$ |
| I-6 | $C_2H_5$ | $BF_4^\ominus$ |
| I-7 | $n\text{-}C_3H_7$ | $AsF_6^\ominus$ |
| I-8 | $iso\text{-}C_3H_7$ | $ClO_4^\ominus$ |
| I-9 | $n\text{-}C_4H_9$ | $ClO_4^\ominus$ |
| I-10 | $n\text{-}C_4H_9$ | $AsF_6^\ominus$ |
| I-11 | $n\text{-}C_4H_9$ | $SbF_6^\ominus$ |
| I-12 | $n\text{-}C_4H_9$ | $BF_4^\ominus$ |
| I-13 | $n\text{-}C_4H_9$ | $I^\ominus$ |
| I-14 | $n\text{-}C_4H_9$ | $CH_3\text{-}C_6H_4\text{-}SO_3^\ominus$ |
| I-15 | $t\text{-}C_4H_9$ | $ClO_4^\ominus$ |
| I-16 | $t\text{-}C_4H_9$ | $AsF_6^\ominus$ |
| I-17 | $n\text{-}C_6H_{13}$ | $ClO_4^\ominus$ |
| I-18 | $n\text{-}C_8H_{17}$ | $AsF_6^\ominus$ |
| I-19 | $n\text{-}C_{12}H_{25}$ | $SbF_6^\ominus$ |
| I-20 | $C_2H_4OH$ | $SbF_6^\ominus$ |
| I-21 | $C_2H_4OH$ | $ClO_4^\ominus$ |
| I-22 | $C_2H_4OH$ | $NO_3^\ominus$ |
| I-23 | $C_2H_4OH$ | $SbF_6^\ominus$ |

Next, specific examples of the compounds used in the formula (5) and (6) are shown. For simplification, the compound represented by the formula (5) is represented by $A,X,(R_1R_2)(R_3R_4)(R_5R_6)(R_7R_8)$ and the compound represented by the formula (6) by $X,(R_1R_2)(R_3R_4)(R_5R_6)(R_7R_8)$. For example, when in the formula (5), A is 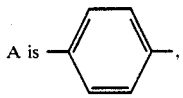, $X^\ominus$ is $ClO_4^\ominus$ and $R_1$ is $CH_2CH_2OCH_3$, and $R_2$ through $R_8$ are $C_3H_7$, the compound is written as:

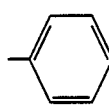, $ClO_4$, $(C_3H_7C_3H_7)_3(C_3H_7CH_2CH_2OCH_3)$.

In the formula (6), when $X^\ominus$ is $ClO_4^\ominus$ and $R_1$ through $R_8$ are methoxyethyl group, the compound is written as:

$ClO_4$, $(CH_2CH_2OCH_3CH_2CH_2OCH_3)_4$.

| Compound No. | |
|---|---|
| 1-1 | 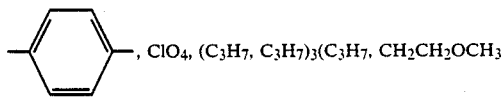, $ClO_4$, $(C_3H_7, C_3H_7)_3(C_3H_7, CH_2CH_2OCH_3)$ |
| 1-2 | 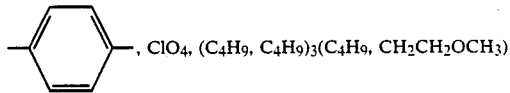, $ClO_4$, $(C_4H_9, C_4H_9)_3(C_4H_9, CH_2CH_2OCH_3)$ |
| 1-3 | 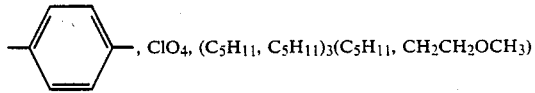, $ClO_4$, $(C_5H_{11}, C_5H_{11})_3(C_5H_{11}, CH_2CH_2OCH_3)$ |
| 1-4 | 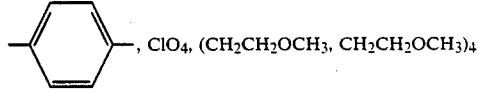, $ClO_4$, $(CH_2CH_2OCH_3, CH_2CH_2OCH_3)_4$ |
| 1-5 | 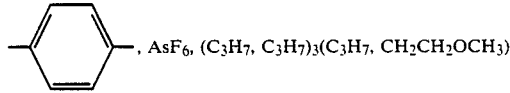, $AsF_6$, $(C_3H_7, C_3H_7)_3(C_3H_7, CH_2CH_2OCH_3)$ |
| 1-6 | 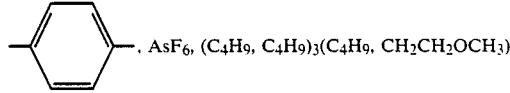, $AsF_6$, $(C_4H_9, C_4H_9)_3(C_4H_9, CH_2CH_2OCH_3)$ |
| 1-7 | 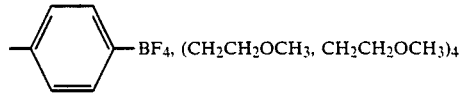$BF_4$, $(CH_2CH_2OCH_3, CH_2CH_2OCH_3)_4$ |

-continued

| Compound No. | |
|---|---|
| 1-8 | 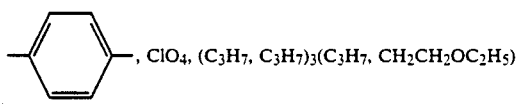, ClO$_4$, (C$_3$H$_7$, C$_3$H$_7$)$_3$(C$_3$H$_7$, CH$_2$CH$_2$OC$_2$H$_5$) |
| 1-9 | 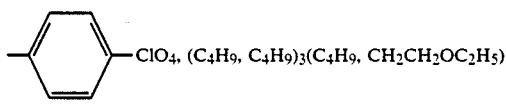ClO$_4$, (C$_4$H$_9$, C$_4$H$_9$)$_3$(C$_4$H$_9$, CH$_2$CH$_2$OC$_2$H$_5$) |
| 1-10 | 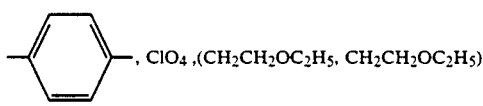, ClO$_4$, (CH$_2$CH$_2$OC$_2$H$_5$, CH$_2$CH$_2$OC$_2$H$_5$) |
| 1-11 | 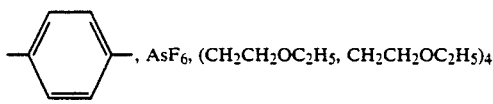, AsF$_6$, (CH$_2$CH$_2$OC$_2$H$_5$, CH$_2$CH$_2$OC$_2$H$_5$)$_4$ |
| 1-12 | 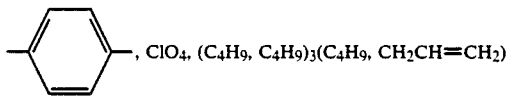, ClO$_4$, (C$_4$H$_9$, C$_4$H$_9$)$_3$(C$_4$H$_9$, CH$_2$CH=CH$_2$) |
| 1-13 | 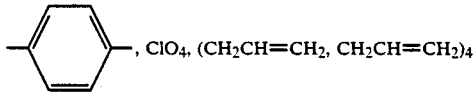, ClO$_4$, (CH$_2$CH=CH$_2$, CH$_2$CH=CH$_2$)$_4$ |
| 1-14 | 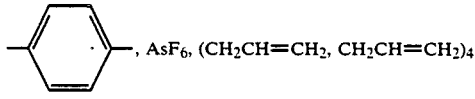, AsF$_6$, (CH$_2$CH=CH$_2$, CH$_2$CH=CH$_2$)$_4$ |
| 1-15 | 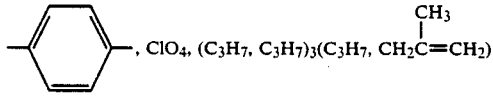, ClO$_4$, (C$_3$H$_7$, C$_3$H$_7$)$_3$(C$_3$H$_7$, CH$_2$$\overset{\underset{\mid}{CH_3}}{C}$=CH$_2$) |
| 1-16 | 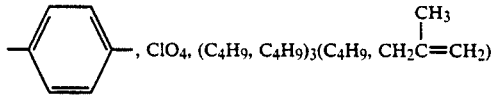, ClO$_4$, (C$_4$H$_9$, C$_4$H$_9$)$_3$(C$_4$H$_9$, CH$_2$$\overset{\underset{\mid}{CH_3}}{C}$=CH$_2$) |
| 1-17 | 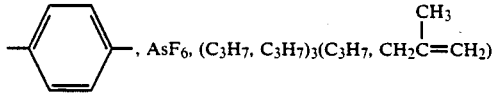, AsF$_6$, (C$_3$H$_7$, C$_3$H$_7$)$_3$(C$_3$H$_7$, CH$_2$$\overset{\underset{\mid}{CH_3}}{C}$=CH$_2$) |
| 1-18 | 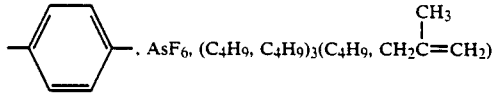, AsF$_6$, (C$_4$H$_9$, C$_4$H$_9$)$_3$(C$_4$H$_9$, CH$_2$$\overset{\underset{\mid}{CH_3}}{C}$=CH$_2$) |
| 1-19 | 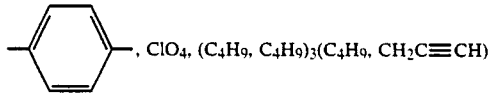, ClO$_4$, (C$_4$H$_9$, C$_4$H$_9$)$_3$(C$_4$H$_9$, CH$_2$C≡CH) |
| 1-20 | 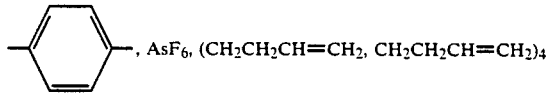, AsF$_6$, (CH$_2$CH$_2$CH=CH$_2$, CH$_2$CH$_2$CH=CH$_2$)$_4$ |

-continued

| Compound No. | | |
|---|---|---|
| 1-21 | 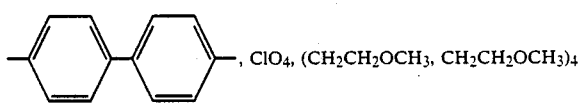 | , ClO$_4$, (CH$_2$CH$_2$OCH$_3$, CH$_2$CH$_2$OCH$_3$)$_4$ |
| 1-22 | 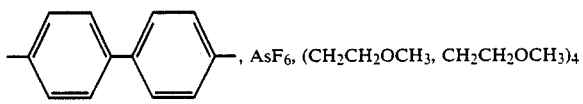 | , AsF$_6$, (CH$_2$CH$_2$OCH$_3$, CH$_2$CH$_2$OCH$_3$)$_4$ |
| 1-23 | 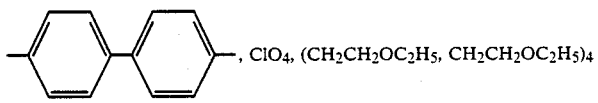 | , ClO$_4$, (CH$_2$CH$_2$OC$_2$H$_5$, CH$_2$CH$_2$OC$_2$H$_5$)$_4$ |
| 1-24 | 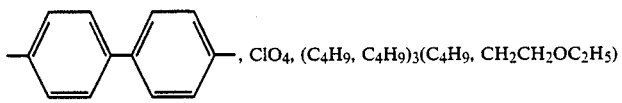 | , ClO$_4$, (C$_4$H$_9$, C$_4$H$_9$)$_3$(C$_4$H$_9$, CH$_2$CH$_2$OC$_2$H$_5$) |
| 1-25 | 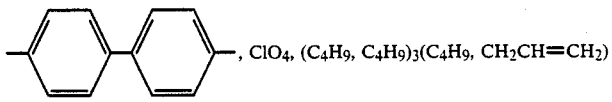 | , ClO$_4$, (C$_4$H$_9$, C$_4$H$_9$)$_3$(C$_4$H$_9$, CH$_2$CH=CH$_2$) |
| 1-26 | 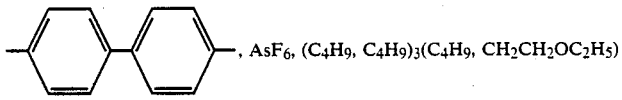 | , AsF$_6$, (C$_4$H$_9$, C$_4$H$_9$)$_3$(C$_4$H$_9$, CH$_2$CH$_2$OC$_2$H$_5$) |
| 2-1 | ClO$_4$, (CH$_2$CH$_2$OCH$_3$, CH$_2$CH$_2$OCH$_3$)$_4$ | |
| 2-2 | ClO$_4$, (C$_4$H$_9$, C$_4$H$_9$)$_3$(C$_4$H$_9$, CH$_2$CH$_2$OCH$_3$) | |
| 2-3 | ClO$_4$, (C$_5$H$_{11}$, C$_5$H$_{11}$)$_3$(C$_5$H$_{11}$, CH$_2$CH$_2$OCH$_3$) | |
| 2-4 | ClO$_4$, (C$_3$H$_7$, C$_3$H$_7$)$_3$(C$_3$H$_7$, CH$_2$CH$_2$OC$_2$H$_5$) | |
| 2-5 | ClO$_4$, (CH$_2$CH$_2$C$_2$H$_5$, CH$_2$CH$_2$OC$_2$H$_5$)$_4$ | |
| 2-6 | AsF$_6$, (C$_4$H$_9$, C$_4$H$_9$)$_3$(C$_4$H$_9$, CH$_2$CH$_2$OCH$_3$) | |
| 2-7 | AsF$_6$, (C$_3$H$_7$, C$_3$H$_7$)$_3$(C$_3$H$_7$, CH$_2$CH$_2$OC$_2$H$_5$) | |
| 2-8 | AsF$_6$, (CH$_2$CH$_2$OC$_2$H$_5$, CH$_2$CH$_2$OC$_2$H$_5$)$_4$ | |
| 2-9 | ClO$_4$, (C$_4$H$_9$, C$_4$H$_9$)$_3$(C$_4$H$_9$, CH$_2$CH=CH$_2$) | |
| 2-10 | ClO$_4$, (CH$_2$CH=CH$_2$, CH$_2$CH=CH$_2$)$_4$ | |
| 2-11 | AsF$_6$, (C$_4$H$_9$, C$_4$H$_9$)$_3$(C$_4$H$_9$, CH$_2$CH=CH$_2$) | |
| 2-12 | AsF$_6$, (C$_6$H$_{13}$, C$_6$H$_{13}$)$_3$(C$_6$H$_{13}$, CH$_2$CH=CH$_2$) | |
| 2-13 | AsF$_6$, (CH$_2$CH=CH$_2$, CH$_2$CH=CH$_2$)$_4$ | |
| 2-14 | BF$_4$, (C$_4$H$_9$, C$_4$H$_9$)$_3$(C$_4$H$_9$, CH$_2$CH=CH$_2$) | |
| 2-15 | 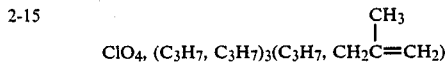 | |
| 2-16 | 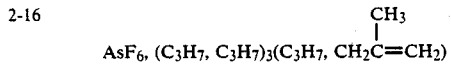 | |
| 2-17 | ClO$_4$, (C$_4$H$_9$, C$_4$H$_9$)$_3$(C$_4$H$_9$, CH$_2$C≡CH) | |
| 2-18 | AsF$_6$, (C$_4$H$_9$, C$_4$H$_9$)$_3$(C$_4$H$_9$, CH$_2$C≡CH) | |
| 2-19 | ClO$_4$, (CH$_2$C≡CH, CH$_2$C≡CH)$_4$ | |
| 2-20 | ClO$_4$, (CH$_2$CH$_2$CH=CH$_2$, CH$_2$CH$_2$CH=CH$_2$)$_4$ | |

For 2-15: ClO$_4$, (C$_3$H$_7$, C$_3$H$_7$)$_3$(C$_3$H$_7$, CH$_2$C(CH$_3$)=CH$_2$)

For 2-16: AsF$_6$, (C$_3$H$_7$, C$_3$H$_7$)$_3$(C$_3$H$_7$, CH$_2$C(CH$_3$)=CH$_2$)

The optical recording medium of the present invention can be made to have a structure as shown in FIG. 1. The optical recording medium shown in FIG. 1 can be formed by providing an organic thin film 2 containing at least a polymethine compound and an aminium salt compound or a diimonium salt compound on a substrate 1. Such organic thin film 2 can be formed by coating a coating liquid having the above compounds dissolved and mixed, or dispersed and mixed in an organic solvent.

Also, in forming the organic thin film 2, two or more kinds of the above compounds can be used in combination, and further other dyes than the compounds of the above formulae [1-I] through [2-IV], such as polymethine type, azulene type, pyrylium type, squarium type, croconium type, triphenylmethane type, xanthene type, anthraquinone type, cyanine type, phthalocyanine type, dioxazine type, tetrahydrocholine type, triphenothiazine type, phenanthrene type, metal chelate complex type dyes, etc., or metal or metal compounds, etc., such as Al, Te, Bi, Sn, In, Se, SnO, TeO$_2$, As, Cd, etc. can be mixed and dispersed, or laminated.

The above compounds may be also contained in a binder in the dispersed or dissolved state, and examples of the binder may include cellulose esters such as nitrocellulose, cellulose phosphate, cellulose sulfate, cellulose acetate, cellulose propionate, cellulose lactate, cellulose myristate, cellulose palmitate, cellulose acetate propionate, cellulose acetate butyrate, etc.; cellulose ethers such as methyl cellulose, ethyl cellulose, propyl cellulose, butyl cellulose, etc.; vinyl resins such as polystyrene, polyvinyl chloride, poly(vinyl acetate), polyvinyl butyral, polyvinyl acetal, polyvinyl alcohol, polyvinyl pyrrolidone, etc.; copolymer resins such as styrene-butadiene copolymer, styreneacrylonitrile copolymer, styrene-butadieneacrylonitrile copolymer, vinyl chloride-vinyl acetate copolymer; acrylic resins such as polymethyl methacrylate, polymethyl acrylate, polybutyl acrylate, polyacrylic acid, polymethacrylic acid, polyacrylamide, polyacrylonitrile, etc.; polyesters such as polyethylene terephthalate, etc.; polyacrylate resins such as poly(4,4'-isopropylidenediphenylene-co-1,4'-cyclohexylenedimethylenecarbonate), poly(ethylenedioxy-3,3'-phenylenethiocarbonate), poly(4,4'-isopropylidenediphenylene-carbonate-co-telephthalate), poly(4,4'-isopropylidenediphenylene carbonate), poly(4,4'-sec-butylidenediphenylenecarbonate), poly(4,4'-isopropylidenediphenylenecarbonate-block-oxyethylene), etc; or polyamides; polyimides; epoxy resins; phenol resins; polyolefins such as polyethylene, polypropylene, chlorinated polyethylene, etc.

Also, in the recording layer 2, surfactants, antistatic agents, stabilizers, dispersing agents, flame retardants, lubricants, plasticizers, etc. may be also incorporated.

The organic solvent which can be used during coating may differ depending on whether the coating liquid is made a dispersion or a solution, but may generally include alcohols such as methanol, ethanol, isopropanol, diacetone alcohol, etc.; ketones such as acetone, methyl ethyl ketone, cyclohexanone, etc.; amides such as N,N-dimethylformamide, N,N-dimethylacetamide, etc.; sulfoxides such as dimethylsulfoxide, etc.; ethers such as tetrahydrofuran, dioxane, ethylene glycol monomethyl ether, etc.; esters such as methyl acetate, ethyl acetate, butyl acetate, etc.; aliphatic halogenated hydrocarbons such as chloroform, methylene chloride, dichloroethylene, carbon tetrachloride, trichloroethylene, etc.; aromatics such as benzene, toluene, xylene, monochlorobenzene, dichlorobenzene; or aliphatic hydrocarbons such as n-hexane, cyclohexanoligroin, etc.

Coating can be practiced by use of dip coating, spray coating, spinner coating, bead coating, wire bar coating, blade coating, roller coating, curtain coating, etc.

The amount of the aminium salt compound and/or the diimonium salt compound added may be suitably 1 to 60% by weight, preferably 5 to 40% by weight, more preferably 10 to 30% by weight, relative to the organic thin film layer based on the total solids. The organic thin film layer 2 should have a dry film thickness suitably of 50 Å to 100 μm, preferably 200 Å to 1 μm.

As the substrate 1, plastics such as polyester, polycarbonate, acrylic resin, polyolefin resin, phenol resin, epoxy resin, polyamide, polyimide, etc., glasses or metals can be used.

Figure 2:
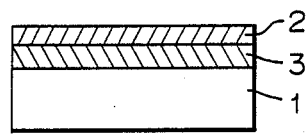
Figure 3:
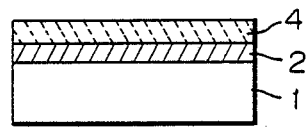
Figure 4:
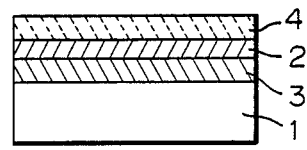

Also, as shown in FIGS. 2 to 4, the constitution can be made to have a subbing layer 3 and/or a protective layer 4.

The subbing layer is provided for the purpose of improving adhesiveness and also barrier properties against water or gas, storage stability of the recording layer as well as reflectance, protecting the substrate against solvents, and also for formation of pregroove and heat dissipation effect. The materials used for these materials may include primarily inorganic compounds, metals or organic polymeric compounds. Examples of inorganic compounds may include $SiO_2$, $MgF_2$, SiO, $TiO_2$, ZnO, TiN, SiN, etc.; examples of metals Zn, Cu, Ni, Al, Cr, Ge, Se, Cd, etc.; and examples of organic polymeric compounds ionomer resins, polyamide type resins, vinyl resins, natural polymers, epoxy resins, silane coupling agents, etc.

As the substrate, plastics such as polyester, polycarbonate, acrylic resin, polyolefin resin, phenol resin, epoxy resin, polyamide, polyimide, etc., glasses or metals can be used.

EXAMPLE 1-1

On a polymethyl methacrylate (hereinafter abbreviated as "PMMA") with a diameter of 130 mm φ and a thickness of 1.2 mm, a pre-group with a thickness of 50μ was provided by use of an epoxy-acrylate type UV-ray curable resin according to the 2P method (the photopolymer method), and a liquid having the above polymethine type dye compound No. D-1 and the above aminium salt compound No. A-9 dissolved at a weight ratio of 80:20 in 1,2-dichloroethane was applied according to spinner coating, followed by drying, to obtain an organic thin film layer of 850 Å.

The thus prepared optical recording medium was mounted on a turn table, and under rotation of the turn table by a motor at 1800 rpm, information was written at a recording power of 6 mW and a recording frequency of 2 MHz by use of a semiconductor laser of an oscillation wavelength of 830 nm on the organic thin film recording layer with a spot size of 1.5 μmφ, reproduced with a reading power of 0.8 mW, and the reproduced waveform was spectrally analyzed (scanning filter, band width 30 KHz) to measure the C/N ratio (carrier/oise ratio).

Next, the C/N ratio after reading for $10^6$ times of the same recorded portion of the recording medium under the same measurement conditions was measured.

Further, the same recording medium prepared under the same conditions was left to stand under the conditions of 60° C., 95% RH for 3000 hours to perform environmental storage stability test, followed by measurement of reflectance (at 830 nm) and C/N ratio. Also, the same recording medium was irradiated with xenon lamp light of 1000 W/m² (300–900 nm) for 100 hours for testing light stability resistance, and thereafter reflectance (at 830 nm) and C/N ratio were measured. The results are shown in Table 1-1.

TABLE 1-1

| Example | Initial stage | | Repeated reproduction After $10^6$ times | Environmental storage stability 60° C. 95% RH After 3000 hours | | Light resistant stability Xenon lamp 1000 W/m² After 100 hours | |
|---|---|---|---|---|---|---|---|
| | Reflectance (%) | C/N (dB) | C/N (dB) | Reflectance (%) | C/N (dB) | Reflectance (%) | C/N (dB) |
| 1-1 | 25.0 | 57 | 55 | 23.9 | 55 | 22.5 | 53 |

EXAMPLES 1-2 to 1-8

By replacing the polymethine dye and the aminium salt compound used in Example 1-1 with the combinations shown below in Table 1-2, recording media were prepared according to the same procedure as in Example 1 to give optical recording media of Examples 1-2 to 1-8, respectively.

The optical recording media of the above Examples 1-2 to 1-8 were measured according to the same method as in Example 1-1 to obtain the results shown in Table 1-4.

TABLE 1-2

| Example | Polymethine type coloring matter (D) | Aminium salt compound (A) | Weight ratio (D:A) |
|---|---|---|---|
| 1-2 | D-4 | A-1 | 80:20 |
| 1-3 | D-7 | A-12 | 70:30 |
| 1-4 | D-8 | A-21 | 80:20 |
| 1-5 | D-13 | A-26 | 85:15 |
| 1-6 | D-19 | A-5 | 80:20 |
| 1-7 | D-24 | A-10 | 85:15 |
| 1-8 | D-25 | A-19 | 90:10 |

COMPARATIVE EXAMPLES 1-1, 1-2

Optical recording media were prepared and evaluated according to the same method as in Example 1-1 except for omitting the aminium compounds No. A-9 and A-10, respectively, used in Examples 1-1 and 1-7. The results are shown in Table 1-4.

EXAMPLES 1-9 to 1-12

A liquid comprising a mixture of 4 parts by weight of a combination of a polymethine dye (D) and an aminium compound (A) shown below in Table 1-3 and 1 part by weight of a nitrocellulose resin (OH-less Lacquer produced by Dicel K.K.) with 95 parts by weight of methyl ethyl ketone was applied by spinner coating onto a polycarbonate substrate of 130 mm $\phi$ in diameter and 1.2 mm in thickness provided with a pregroup to obtain an organic thin film recording layer with a dried film thickness of 950 Å.

The optical recording medium thus prepared was measured according to the same method as in Example 1-1 to give the results shown in Table 1-4.

TABLE 1-3

| Example | Polymethine type coloring matter (D) | Aminium salt compound (A) | Weight ratio (D:A) |
|---|---|---|---|
| 1-9 | D-2 | A-11 | 70:30 |
| 1-10 | D-16 | A-4 | 75:25 |
| 1-11 | D-20 | A-13 | 85:15 |
| 1-12 | D-22 | A-18 | 80:20 |

TABLE 1-4

| | Initial stage | | Repeated reproduction After $10^6$ times | Environmental storage stability 60° C. 95% RH After 3000 hours | | Light resistant stability Xenon lamp 1000 W/m$^2$ After 100 hours | |
|---|---|---|---|---|---|---|---|
| Example | Reflectance (%) | C/N (dB) | C/N (dB) | Reflectance (%) | C/N (dB) | Reflectance (%) | C/N (dB) |
| 1-2 | 24.5 | 55 | 52 | 23.3 | 54 | 22.5 | 52 |
| 1-3 | 20.3 | 52 | 50 | 19.4 | 50 | 18.7 | 48 |
| 1-4 | 20.6 | 51 | 48 | 19.3 | 49 | 18.5 | 47 |
| 1-5 | 23.8 | 53 | 50 | 22.5 | 51 | 20.3 | 49 |
| 1-6 | 24.8 | 54 | 52 | 22.1 | 52 | 21.8 | 51 |
| 1-7 | 25.3 | 57 | 54 | 24.2 | 55 | 22.4 | 53 |
| 1-8 | 26.5 | 52 | 49 | 24.7 | 50 | 23.5 | 49 |
| Comparative example | | | | | | | |
| 1-1 | 19.8 | 50 | 36 | 16.3 | 45 | 13.1 | 32 |
| 1-2 | 20.3 | 51 | 32 | 17.8 | 46 | 12.6 | 30 |
| Example | | | | | | | |
| 1-9 | 20.0 | 52 | 49 | 18.5 | 49 | 17.5 | 46 |
| 1-10 | 24.5 | 55 | 52 | 23.5 | 53 | 22.1 | 50 |
| 1-11 | 25.3 | 56 | 53 | 24.1 | 55 | 22.8 | 51 |
| 1-12 | 24.8 | 55 | 51 | 22.5 | 53 | 20.5 | 48 |

EXAMPLES 1-12 to 1-15

On a substrate of a polycarbonate of Waret size with a thickness of 0.4 mm (hereinafter abbreviated as "PC"), a pre-group was provided by the hot press method and a mixture of a plymethine dye and an aminium salt compound as indicated below in Table 1-5 in diacetoalcohol was applied by the bar coating method, followed by drying, to form an organic thin film recording layer of 850 Å. Further, on the layer, through an ethylene-vinyl acetate film, a PC substrate of Waret size with a thickness of 0.3 mm was provided according to the hot roll method to prepare an optical recording medium with a closely adhered structure.

The optical recording media of Examples 12-15 thus prepared were each mounted on the stage driven in the X-Y direction, and information was written in the Y-axis direction with a spot size of 3.0 $\mu m\phi$ at a recording power of 4.0 mW and a recording pulse of 80 u sec. by use of a semiconductor laser of oscillation wavelength of 830 nm from the PC substate side with a thickness of 0.4 mm on the organic thin recording layer, and reproduced with a reading power of 0.4 mW, to measure its contrast ratio [(A−B)/A: A is signal intensity at non-recorded portion and B is signal intensity at recorded portion].

Further, the same recording media prepared under the above conditions were subjected to the environmental storage stability tests and light stability resistance tests under the same conditions as in Example 1-1, and thereafter reflectance and contrast ratio were measured. The results are shown in Table 1-6.

TABLE 1-5

| Example | Polymethine type coloring matter (D) | Aminium salt compound (A) | Weight ratio (D:A) |
|---|---|---|---|
| 1-12 | D-1 | A-10 | 80:20 |
| 1-13 | D-6 | A-4 | 75:25 |
| 1-14 | D-17 | A-16 | 80:20 |

TABLE 1-5-continued

| Example | Polymethine type coloring matter (D) | Aminium salt compound (A) | Weight ratio (D:A) |
|---|---|---|---|
| 1-15 | D-21 | A-7 | 85:15 |

TABLE 1-6

| | Initial stage | | Environmental storage stability 60° C. 95% RH After 3000 hours | | Light resistant stability Xenon lamp 1000 W/m² After 100 hours | |
|---|---|---|---|---|---|---|
| Example | Reflectance (%) | Contrast ratio | Reflectance (%) | Contrast ratio | Reflectance (%) | Contrast ratio |
| 1-12 | 15.3 | 0.82 | 14.5 | 0.80 | 12.8 | 0.73 |
| 1-13 | 14.8 | 0.80 | 14.1 | 0.77 | 12.1 | 0.70 |
| 1-14 | 15.1 | 0.80 | 14.3 | 0.78 | 11.9 | 0.69 |
| 1-15 | 15.8 | 0.83 | 15.2 | 0.81 | 13.3 | 0.74 |

EXAMPLES 1-16 to 1-22

In place of the aminium salt compound and the diimonium salt compound used in Example 1-1, recording media were prepared according to the combinations shown in Table 1-7, following otherwise the same procedure as in Example 1-1, to provide optical recording media of Examples 1-17 to 1-23, respectively.

The optical recording media of the above Examples 1-17 to 1-23 were measured according to the same method as in Example 1-1 to obtain the results shown in Table 1-9.

TABLE 1-7

| Example | Polymethine type coloring matter (D) | Diimonium salt compound (I) | Weight ratio (D:I) |
|---|---|---|---|
| 1-16 | D-1 | I-9 | 80:20 |
| 1-17 | D-4 | I-12 | 85:15 |
| 1-18 | D-8 | I-5 | 80:20 |
| 1-19 | D-13 | I-10 | 70:30 |
| 1-20 | D-19 | I-19 | 60:40 |
| 1-21 | D-24 | I-1 | 80:20 |
| 1-22 | D-25 | I-21 | 90:10 |

EXAMPLES 1-23 to 1-26

The aminium salt compound (A) used in Example 1-9 was replaced with the diimonium salt compound (D), and according to the combinations indicated in Table 1-8, recording media were prepared by the same method as in Example 1-1 to provide optical recording media of Examples 1-23 to 1-26.

The optical recording media of the above Examples 1-23 to 1-26 were measured according to the same method as in Example 1-1 to obtain the results shown in Table 1-9.

TABLE 1-8

| Example | Polymethine type coloring matter (D) | Diimonium salt compound (I) | Weight ratio (D:I) |
|---|---|---|---|
| 1-23 | D-2 | I-4 | 80:20 |
| 1-24 | D-16 | I-13 | 90:10 |
| 1-25 | D-20 | I-18 | 75:25 |
| 1-26 | D-22 | I-11 | 85:15 |

TABLE 1-9

| | Initial stage | | Repeated reproduction After 10⁶ times | Environmental storage stability 60° C. 95% RH After 3000 hours | | Light resistant stability Xenon lamp 1000 W/m² After 100 hours | |
|---|---|---|---|---|---|---|---|
| Example | Reflectance (%) | C/N ratio (dB) | C/N ratio (dB) | Reflectance (%) | C/N ratio (dB) | Reflectance (%) | C/N ratio (dB) |
| 1-16 | 25.3 | 57 | 56 | 24.5 | 56 | 22.0 | 52 |
| 1-17 | 24.8 | 56 | 55 | 24.0 | 54 | 21.8 | 51 |
| 1-18 | 21.3 | 51 | 49 | 20.0 | 49 | 18.2 | 46 |
| 1-19 | 24.4 | 55 | 53 | 23.3 | 54 | 20.5 | 49 |
| 1-20 | 25.1 | 56 | 53 | 24.5 | 55 | 21.3 | 51 |
| 1-21 | 25.6 | 57 | 56 | 24.8 | 56 | 22.5 | 53 |
| 1-22 | 26.0 | 53 | 51 | 24.5 | 50 | 22.1 | 49 |
| 1-23 | 21.2 | 51 | 48 | 19.5 | 49 | 18.2 | 45 |
| 1-24 | 25.1 | 56 | 54 | 24.2 | 53 | 22.3 | 51 |
| 1-25 | 25.5 | 57 | 56 | 24.1 | 55 | 21.9 | 53 |
| 1-26 | 24.5 | 55 | 53 | 23.0 | 54 | 21.1 | 51 |

EXAMPLES 1-27 to 1-30

By replacing the aminium salt compound (A) used in Example 1-12 with the diimonium compound (I), recording media were prepared according to the combinations indicated in Table 1-10 in the same manner as in Example 1-12 to provide optical recording media of Examples 1-27 to 1-30, respectively.

The optical recording media of the above Examples 1-27 to 1-30 were measured in the same manner as in Example 1-12 to obtain the results as shown in Table 1-11.

TABLE 1-10

| Example | Polymethine type coloring matter (D) | Diimonium salt compound (I) | Weight ratio (D:I) |
|---|---|---|---|
| 1-27 | D-1 | I-10 | 80:20 |
| 1-28 | D-6 | I-7 | 85:15 |
| 1-29 | D-17 | I-4 | 75:25 |
| 1-30 | D-21 | I-16 | 80:20 |

TABLE 1-11

| Example | Initial stage Reflectance (%) | Initial stage Contrast ratio | Environmental storage stability 60° C. 95% RH After 3000 hours Reflectance (%) | Environmental storage stability 60° C. 95% RH After 3000 hours Contrast ratio | Light resistant stability Xenon lamp 1000 W/m² After 100 hours Reflectance (%) | Light resistant stability Xenon lamp 1000 W/m² After 100 hours Contrast ratio |
|---|---|---|---|---|---|---|
| 1-27 | 15.5 | 0.83 | 14.9 | 0.82 | 12.5 | 0.72 |
| 1-28 | 14.5 | 0.79 | 14.1 | 0.77 | 11.9 | 0.69 |
| 1-29 | 15.2 | 0.81 | 14.8 | 0.80 | 12.3 | 0.70 |
| 1-30 | 16.0 | 0.85 | 15.2 | 0.83 | 12.8 | 0.73 |

EXAMPLE 1-31

Figure 5:
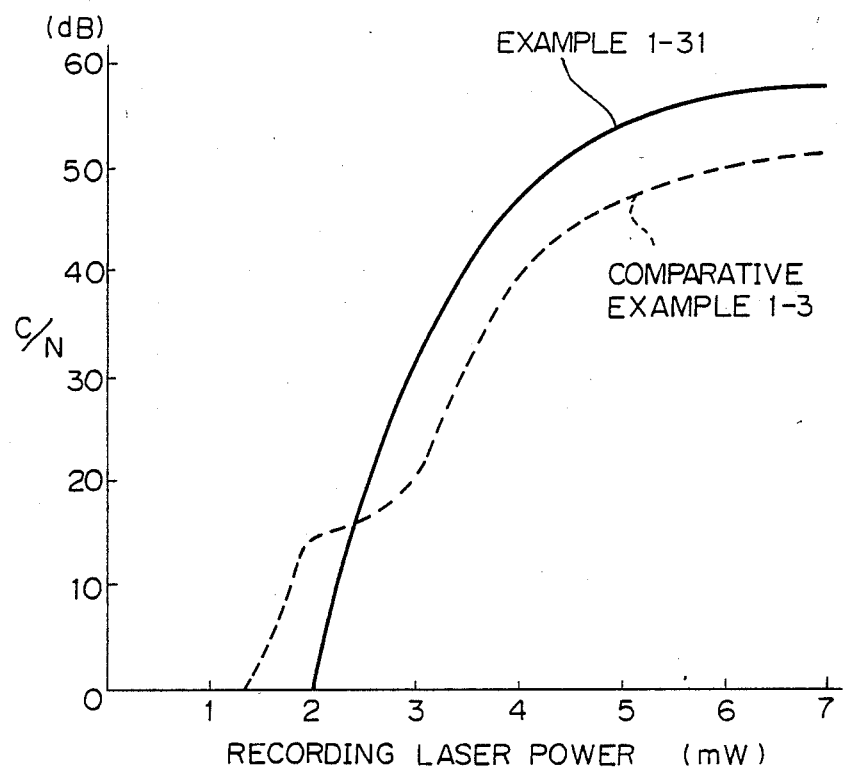
FIG. 5 and FIG. 6 are a graph showing C/N ratio on the vertical axis corresponding to variations of the recording laser power on the horizontal axis.

By use of the optical recording medium prepared in Example 1-16, C/N ratio was measured by varying the recording laser power from 0.5 mW to 7 mW in the evaluation of Example 1-16 for examination of the threshold value. The results are shown in FIG. 5.

COMPARATIVE EXAMPLE 1-3

An optical recording medium was prepared and measured according to the same method as in Example 1-31 except for omitting the aminium salt compound in Example 1-31. The results are shown in FIG. 5.

For the optical recording medium of Example 1-31, a clear threshold value not recorded at a low power of laser power of 2 mW or less can be obtained. In contrast, in Comparative example 1-3, the threshold value was not clear as recorded at a lower power of 2 mW or lower. This indicates that deterioration will readily occur during repeated reproduction.

Also, for Example 1-31, higher C/N value could be obtained as compared with Comparative example 1-3.

EXAMPLES 1-32 and 1-33

By use of the polymethine dye (D-1) together with the aminium salt (A-11) in the case of Example 1-32 and the diimonium salt (I-9) in the case of Example 1-33, respectively, at a weight ratio of 70:30, optical recording media were prepared in the same manner as in Example 1-1 and these optical recording media were evaluated according to the same method as in Example 1-1 to obtain the results shown in Table 1-12.

COMPARATIVE EXAMPLES 1-4–1-7

By use of the following compounds as the polymethine dye, optical recording media were prepared and evaluated similarly as in Examples 1-32 and 1-33. The results are shown in Table 1-12.

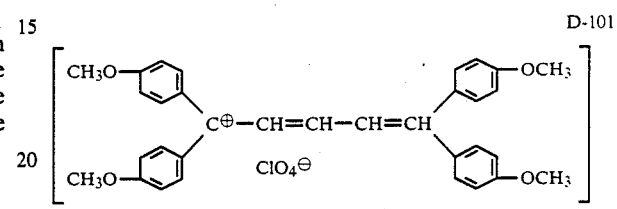

D-101

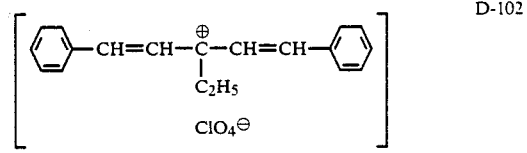

D-102

TABLE 1-12

| Example | Polymethine type coloring matter | Aminium salt or Diimonium salt | Initial stage Reflectance (%) | Initial stage C/N (dB) | Environmental storage stability 45° C. 95% RH After 3000 hours Reflectance (%) | Environmental storage stability 45° C. 95% RH After 3000 hours C/N (dB) | Light resistant stability Xenon lamp 1000 W/m² After 100 hours Reflectance (%) | Light resistant stability Xenon lamp 1000 W/m² After 100 hours C/N (dB) |
|---|---|---|---|---|---|---|---|---|
| 1-32 | D-1 | A-11 | 24.0 | 56 | 23.7 | 54 | 22.5 | 53 |
| 1-33 | D-1 | I-9 | 23.8 | 56 | 23.7 | 55 | 22.6 | 53 |
| Comparative Example 1-4 | D-101 | A-11 | 23.0 | 54 | 22.0 | 52 | 19.7 | 49 |
| 1-5 | D-102 | A-11 | 22.6 | 53 | 22.0 | 52 | 19.8 | 48 |
| 1-6 | D-101 | I-9 | 23.1 | 54 | 22.2 | 52 | 19.7 | 48 |
| 1-7 | D-102 | I-9 | 22.9 | 52 | 22.1 | 50 | 19.8 | 48 |

EXAMPLE 2-1

On a polymethyl methacrylate (hereinafter abbreviated as "PMMA") with a diameter of 130 mm o and a thickness of 1.2 mm, a pre-group with a thickness of 50μ was provided by use of an epoxy-acrylate type UV-ray curable resin according to the 2P method (the photopolymer method), and a liquid having the above polymethine type dye compound No. D-38 and the above aminium salt compound No. A-9 dissolved at a weight ratio of 80:20 in 1,2-dichloroethane was applied according to spinner coating, followed by drying, to obtain an organic thin film layer of 850 Å.

The thus prepared optical recording medium was mounted on a turn table, and under rotation of the turn table by a motor at 1800 rpm, information was written at a recording power of 6 mW and a recording frequency of 2 MHz by use of a semiconductor laser of an oscillation wavelength of 830 nm on the organic thin film recording layer with a spot size of 1.5 μmφ, reproduced with a reading power of 0.8 mW, and the reproduced waveform was spectrally analyzed (scanning filter, band width 30 KHz) to measure the C/N ratio (carrier/oise ratio).

Next, the C/N ratio after reading for $10^6$ times of the same recorded portion of the recording medium under the same measurement conditions was measured.

Further, the same recording medium prepared under the same conditions was left to stand under the conditions of 45° C., 95% RH for 3000 hours to perform environmental storage stability test, followed by measurement of reflectance (at 830 nm) and C/N ratio. Also, the same recording medium was irradiated with xenon lamp light of 1000 W/m² (300–900 nm) for 100 hours for testing light stability resistance, and thereafter reflectance (at 830 nm) and C/N ratio were measured. The results are shown in Table 2-1.

TABLE 2-1

| Example | Initial stage Reflectance (%) | Initial stage C/N (dB) | Repeated reproduction After $10^6$ times C/N (dB) | Environmental storage stability 45° C. 95% RH after 3000 hours Reflectance (%) | Environmental storage stability 45° C. 95% RH after 3000 hours C/N (dB) | Light resistant stability Xenon lamp 1000 W/m² After 100 hours Reflectance (%) | Light resistant stability Xenon lamp 1000 W/m² After 100 hours C/N (dB) |
|---|---|---|---|---|---|---|---|
| 2-1 | 26.2 | 55 | 52 | 24.5 | 53 | 21.5 | 50 |

EXAMPLES 2-2 to 2-9

By replacing the polymethine dye and the aminium salt compound (A) used in Example 2-1 with the combinations shown below in Table 2-2, recording media were prepared according to the same procedure as in Example 2-1 to give optical recording media of Examples 2-2 to 2-9, respectively.

The optical recording media of the above Examples 2-2 to 2-9 were measured according to the same method as in Example 2-1 to obtain the results shown in Table 2-4.

TABLE 2-2

| Example | Polymethine compound (D) | Aminium salt compound (A) | Weight ratio (D:A) |
|---|---|---|---|
| 2-2 | D-28 | A-11 | 80:20 |
| 2-3 | D-33 | A-5 | 85:15 |
| 2-4 | D-46 | A-19 | 75:25 |
| 2-5 | D-59 | A-21 | 70:30 |
| 2-6 | D-67 | A-26 | 90:10 |
| 2-7 | D-75 | A-12 | 80:20 |
| 2-8 | D-89 | A-1 | 80:20 |

TABLE 2-2-continued

| Example | Polymethine compound (D) | Aminium salt compound (A) | Weight ratio (D:A) |
|---|---|---|---|
| 2-9 | D-96 | A-16 | 85:15 |

EXAMPLES 2-10 to 2-13

A liquid comprising a mixture of 4 parts by weight of a combination of a polymethine dye (D) and an aminium compound (A) shown below in Table 2-3 and 1 part by weight of a nitrocellulose resin (OH-less Lacquer produced by Dicel K.K.) with 95 parts by weight of methyl ethyl ketone was applied by spinner coating onto a polycarbonate substrate of 130 mm φ in diameter and 1.2 mm in thickness provided with a pregroup to obtain an organic thin film recording layer with a dried film thickness of 950 Å.

The optical recording medium thus prepared was measured according to the same method as in Example 1-1 to give the results shown in Table 2-4.

TABLE 2-3

| Example | Polymethine compound (D) | Aminium salt compound (A) | Weight ratio (D:A) |
|---|---|---|---|
| 2-10 | D-31 | A-3 | 85:15 |
| 2-11 | D-53 | A-6 | 90:10 |
| 2-12 | D-71 | A-10 | 80:20 |
| 2-13 | D-93 | A-22 | 75:25 |

COMPARATIVE EXAMPLES 2-1, 2-2

Optical recording media were prepared and evaluated according to the same method as in Example 2-1 except for omitting the aminium salt compounds No. A-9 and A-26 respectively used in Examples 2-1 and 2-6. The results are shown in Table 2-4.

TABLE 2-4

| | Initial stage Reflectance (%) | Initial stage C/N (dB) | Repeated reproduction After $10^6$ times C/N (dB) | Environmental storage stability 45° C. 95% RH After 3000 hours Reflectance (%) | Environmental storage stability 45° C. 95% RH After 3000 hours C/N (dB) | Light resistant stability Xenon lamp 1000 W/m² After 100 hours Reflectance (%) | Light resistant stability Xenon lamp 1000 W/m² After 100 hours C/N (dB) |
|---|---|---|---|---|---|---|---|
| Example | | | | | | | |
| 2-2 | 25.3 | 54 | 51 | 24.1 | 52 | 20.5 | 48 |
| 2-3 | 24.8 | 53 | 50 | 23.5 | 50 | 19.8 | 47 |
| 2-4 | 24.5 | 53 | 51 | 23.2 | 50 | 19.3 | 46 |
| 2-5 | 25.6 | 54 | 50 | 24.1 | 52 | 20.8 | 49 |
| 2-6 | 23.1 | 50 | 47 | 21.5 | 48 | 17.6 | 44 |
| 2-7 | 24.7 | 54 | 52 | 21.3 | 49 | 19.8 | 47 |
| 2-8 | 24.3 | 52 | 50 | 22.2 | 50 | 18.5 | 46 |
| 2-9 | 22.5 | 48 | 46 | 21.0 | 46 | 17.8 | 43 |
| 2-10 | 24.5 | 54 | 51 | 22.8 | 52 | 20.7 | 49 |
| 2-11 | 25.2 | 55 | 51 | 23.4 | 52 | 20.6 | 48 |
| 2-12 | 23.4 | 51 | 48 | 22.1 | 49 | 19.9 | 46 |
| 2-13 | 24.4 | 53 | 50 | 23.2 | 50 | 20.1 | 48 |
| Comparative example | | | | | | | |
| 2-1 | 25.8 | 51 | 32 | 14.3 | 40 | 12.1 | 30 |
| 2-2 | 23.5 | 46 | 28 | 12.8 | 36 | 10.9 | 24 |

EXAMPLES 2-14 to 2-17

On a substrate of a polycarbonate of Waret size with a thickness of 0.4 mm (hereinafter abbreviated as "PC"), a pre-group was provided by the hot press method and a mixture of a cyclic polymethine compound and an aminium salt compound as indicated below in Table 2-5 in diacetoalcohol was applied by the bar coating method, followed by drying, to form an organic thin film recording layer of 850 Å. Further, on the layer, through an ethylene-vinyl acetate film, a PC substrate of Waret size with a thickness of 0.3 mm was provided according to the hot roll method to prepare an optical recording medium with a closely adhered structure.

The optical recording media of Examples 2-14 to 2-17 thus prepared were each mounted on the stage driven in the X-Y direction, and information was written in the Y-axis direction with a spot size of 3.0 μmφ at a recording power of 4.0 mW and a recording pulse of 80 u sec. by use of a semiconductor laser of oscillation wavelength of 830 nm from the PC substate side with a thickness of 0.4 mm on the organic thin recording layer, and reproduced with a reading power of 0.4 mW, to measure its contrast ratio [(A−B)/A: A is signal intensity at non-recorded portion and B is signal intensity at recorded portion].

Further, the same recording media prepared under the above conditions were subjected to the environmental storage stability tests and light stability resistance tests under the same conditions as in Example 2-1, and thereafter reflectance and contrast ratio were measured. The results are shown in Table 2-6.

TABLE 2-5

| Example | Polymethine compound (D) | Aminium salt compound (A) | Weight ratio (D:A) |
| --- | --- | --- | --- |
| 2-14 | D-28 | A-8 | 75:25 |
| 2-15 | D-47 | A-11 | 80:20 |
| 2-16 | D-69 | A-18 | 85:15 |
| 2-17 | D-86 | A-23 | 70:30 |

TABLE 2-6

| | Initial stage | | Environmental storage stability 45° C. 95% RH After 3000 hours | | Light resistant stability Xenon lamp 1000 W/m² After 100 hours | |
| --- | --- | --- | --- | --- | --- | --- |
| Example | Reflectance (%) | Contrast ratio | Reflectance (%) | Contrast ratio | Reflectance (%) | Contrast ratio |
| 2-14 | 14.8 | 0.81 | 14.0 | 0.79 | 12.5 | 0.76 |
| 2-15 | 15.0 | 0.82 | 14.1 | 0.79 | 12.3 | 0.75 |
| 2-16 | 14.5 | 0.80 | 13.8 | 0.78 | 11.5 | 0.72 |
| 2-17 | 14.9 | 0.80 | 14.0 | 0.78 | 11.8 | 0.74 |

EXAMPLES 2-18 to 2-21

In place of the aminium salt compound, the diimonium salt compound was used, and recording media were prepared according to the combinations shown in Table 2-7, following otherwise the same procedure as in Example 2-1, to provide optical recording media of Examples 2-18 to 2-21, respectively.

The optical recording media of the above Examples 2-18 to 2-21 were measured according to the same method as in Example 2-1 to obtain the results shown in Table 2-9.

TABLE 2-7

| Example | Polymethine compound (D) | Diimonium salt compound (I) | Weight ratio (D:I) |
| --- | --- | --- | --- |
| 2-18 | D-38 | I-9 | 80:20 |
| 2-19 | D-70 | I-26 | 75:25 |
| 2-20 | D-46 | I-22 | 80:20 |
| 2-21 | D-92 | I-19 | 75:25 |

EXAMPLES 2-22 to 2-25

In place of the aminium salt compound, the diimonium salt compound was used, and recording media were prepared according to the combinations shown in Table 2-8, following otherwise the same procedure as in Example 2-10, to provide optical recording media of Examples 2-22 to 2-25, respectively.

The optical recording media of the above Examples 2-22 to 2-25 were measured according to the same method as in Example 2-1 to obtain the results shown in Table 2-9.

TABLE 2-8

| Example | Polymethine compound (D) | Diimonium salt compound (I) | Weight ratio (D:I) |
| --- | --- | --- | --- |
| 2-22 | D-29 | I-6 | 80:20 |
| 2-23 | D-56 | I-2 | 75:25 |
| 2-24 | D-76 | I-11 | 80:20 |
| 2-25 | D-95 | I-18 | 85:15 |

TABLE 2-9

| Example | Initial stage Reflectance (%) | Initial stage C/N (dB) | Repeated reproduction After 10⁶ times C/N (dB) | Environmental storage stability 45° C. 95% RH After 3000 hours Reflectance (%) | Environmental storage stability 45° C. 95% RH After 3000 hours C/N (dB) | Light resistant stability Xenon lamp 1000 W/m² After 100 hours Reflectance (%) | Light resistant stability Xenon lamp 1000 W/m² After 100 hours C/N (dB) |
| --- | --- | --- | --- | --- | --- | --- | --- |
| 2-18 | 25.0 | 55 | 53 | 24.2 | 53 | 21.3 | 49 |
| 2-19 | 24.5 | 54 | 53 | 23.8 | 52 | 20.8 | 49 |
| 2-20 | 24.8 | 54 | 51 | 22.6 | 52 | 20.1 | 48 |
| 2-21 | 25.2 | 55 | 54 | 24.5 | 53 | 21.5 | 50 |
| 2-22 | 23.2 | 52 | 50 | 22.5 | 50 | 19.6 | 47 |
| 2-23 | 24.0 | 52 | 51 | 23.1 | 50 | 18.5 | 46 |
| 2-24 | 23.8 | 53 | 52 | 23.0 | 51 | 19.7 | 47 |
| 2-25 | 24.3 | 52 | 50 | 22.9 | 50 | 19.8 | 48 |

EXAMPLES 2-26 to 2-29

The aminium salt compound (A) used in Example 2-14 was replaced with the diimonium salt compound (I), and according to the combinations indicated in Table 2-10, recording media were prepared by the same method as in Example 2-14 to provide optical recording media of Examples 2-26 to 2-29.

The optical recording media of the above Examples 2-26 to 2-29 were measured according to the same method as in Example 2-14 to obtain the results shown in Table 2-11.

TABLE 2-10

| Example | Polymethine compound (D) | Diimonium salt compound (I) | Weight ratio (D:I) |
| --- | --- | --- | --- |
| 2-26 | D-35 | I-12 | 80:20 |
| 2-27 | D-54 | I-5 | 70:30 |
| 2-28 | D-64 | I-9 | 75:25 |
| 2-29 | D-83 | I-22 | 80:20 |

TABLE 2-11

| Example | Initial stage Reflectance (%) | Initial stage Contrast ratio | Environmental storage stability 45° C. 95% RH After 3000 hours Reflectance (%) | Environmental storage stability 45° C. 95% RH After 3000 hours Contrast ratio | Light resistant stability Xenon lamp 1000 W/m² After 100 hours Reflectance (%) | Light resistant stability Xenon lamp 1000 W/m² After 100 hours Contrast ratio |
| --- | --- | --- | --- | --- | --- | --- |
| 2-26 | 15.4 | 0.81 | 14.5 | 0.79 | 12.3 | 0.71 |
| 2-27 | 14.6 | 0.80 | 14.0 | 0.77 | 12.0 | 0.69 |
| 2-28 | 15.2 | 0.80 | 14.5 | 0.78 | 12.5 | 0.72 |
| 2-29 | 14.5 | 0.78 | 13.8 | 0.75 | 11.8 | 0.68 |

EXAMPLES 2-30

Figure 6:
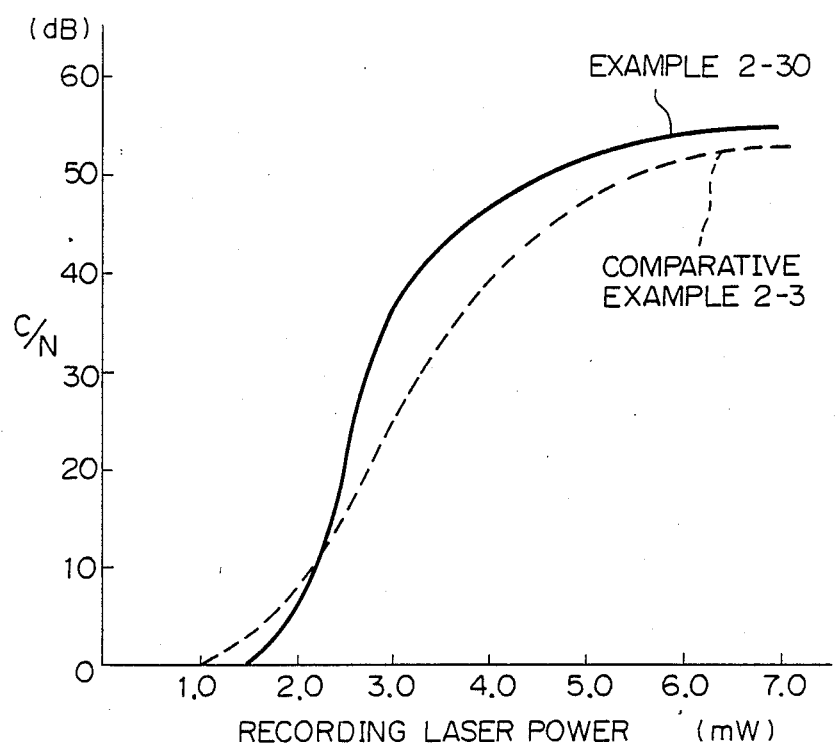

In evaluation of Example 2-19 by use of the optical recording medium prepared in Example 2-19, C/N ratio was measured by varying the recording laser power from 0.5 mW to 7 mW for examination of the threshold value. The results are shown in FIG. 6.

COMPARATIVE EXAMPLE 2-3

An optical recording medium was prepared and measured according to the same method as in Example 2-30 except for omitting the aminium salt compound in Example 2-30. The results are shown in FIG. 6.

For the optical recording medium of Example 2-30, a clear threshold value not recorded at a low power of laser power of 2 mW or less can be obtained. In contrast, in Comparative example 2-3, the threshold value was not clear as recorded at a lower power of 2 mW or lower. This indicates that deterioration will readily occur during repeated reproduction.

Also, for Example 2-30, higher C/N value could be obtained as compared with Comparative example 2-3.

EXAMPLES 2-31 to 2-48

By use of the polymethine type dyes and the aminium salt (A-11) or the diimonium salt (I-9) as shown in Table 2-12 each at a weight ratio of 70:30, optical recording media were prepared in the same manner as in Example 2-1, and their evaluations were performed. The results are shown in Table 2-12.

COMPARATIVE EXAMPLES 2-4 to 2-19

By use of the polymethine type dyes shown below and the aminium salt (A-11) or the diimonium salt (I-9), optical recording media were prepared in the same manner as in Example 2-31 and evaluated. The results are shown in Table 2-12.

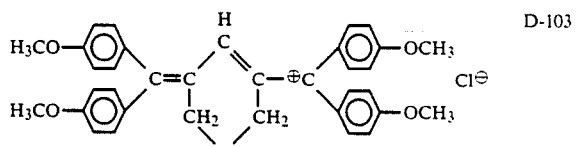

D-103

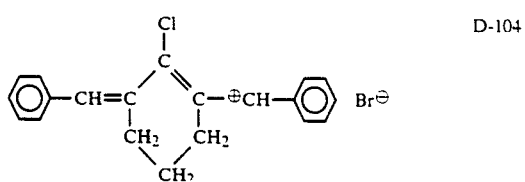

D-104

-continued

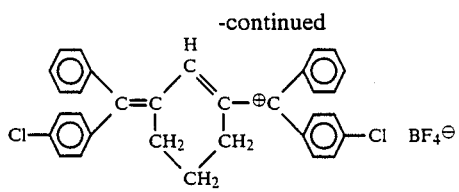
D-105

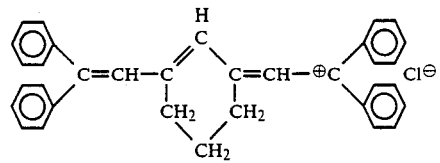
D-106

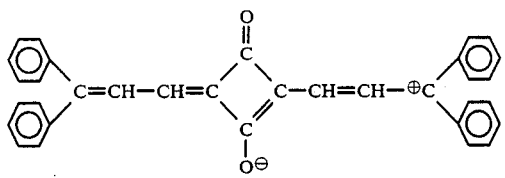
D-107

-continued

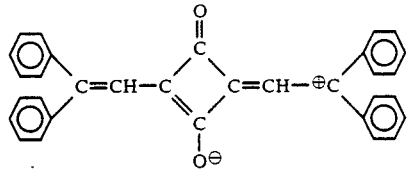
D-108

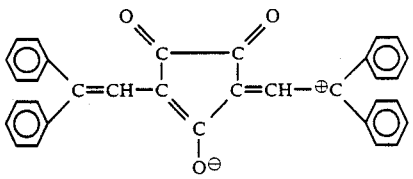
D-109

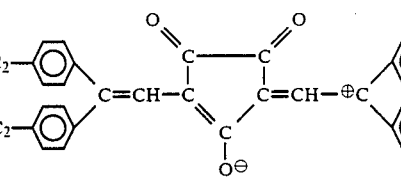
D-110

TABLE 2-12

| | Polymethine type coloring matter | Aminium salt or Diimonium salt | Initial state | | Environmental storage stability 45° C. 95% RH After 3000 hours | | Light resistant stability Xenon lamp 1000 W/m² After 100 hours | |
|---|---|---|---|---|---|---|---|---|
| | | | Reflectance (%) | C/N (dB) | Reflectance (%) | C/N (dB) | Reflectance (%) | C/N (dB) |
| Example | | | | | | | | |
| 2-31 | D-28 | A-11 | 25.0 | 54 | 24.1 | 52 | 20.5 | 48 |
| 2-32 | D-29 | A-11 | 23.2 | 52 | 22.5 | 50 | 19.6 | 47 |
| 2-33 | D-31 | A-11 | 24.8 | 53 | 22.8 | 52 | 20.7 | 49 |
| 2-34 | D-38 | A-11 | 25.0 | 54 | 23.8 | 51 | 20.8 | 49 |
| 2-35 | D-51 | A-11 | 23.4 | 51 | 22.1 | 49 | 19.9 | 46 |
| 2-36 | D-69 | A-11 | 24.4 | 50 | 22.6 | 48 | 19.6 | 44 |
| 2-37 | D-70 | A-11 | 24.7 | 53 | 22.3 | 49 | 20.3 | 47 |
| 2-38 | D-71 | A-11 | 23.3 | 52 | 22.2 | 50 | 19.5 | 46 |
| 2-39 | D-88 | A-11 | 24.1 | 49 | 23.0 | 47 | 19.8 | 45 |
| 2-40 | D-28 | I-9 | 24.8 | 53 | 24.2 | 52 | 20.7 | 48 |
| 2-41 | D-29 | I-9 | 23.1 | 52 | 22.5 | 50 | 19.8 | 48 |
| 2-42 | D-31 | I-9 | 24.9 | 53 | 22.7 | 51 | 20.6 | 48 |
| 2-43 | D-38 | I-9 | 24.8 | 53 | 22.4 | 51 | 20.5 | 47 |
| 2-44 | D-51 | I-9 | 23.6 | 51 | 22.6 | 49 | 20.0 | 46 |
| 2-45 | D-69 | I-9 | 24.4 | 50 | 22.7 | 47 | 19.8 | 45 |
| 2-46 | D-70 | I-9 | 24.5 | 52 | 22.5 | 48 | 20.1 | 47 |
| 2-47 | D-71 | I-9 | 23.8 | 52 | 22.2 | 50 | 19.6 | 47 |
| 2-48 | D-88 | I-9 | 24.0 | 50 | 22.8 | 47 | 19.7 | 45 |
| Comparative Example | | | | | | | | |
| 2-4 | D-103 | A-11 | 24.5 | 52 | 24.0 | 50 | 18.0 | 46 |
| 2-5 | D-104 | A-11 | 25.4 | 52 | 24.8 | 51 | 18.7 | 46 |
| 2-6 | D-105 | A-11 | 24.2 | 51 | 22.2 | 47 | 18.8 | 45 |
| 2-7 | D-106 | A-11 | 24.8 | 50 | 23.0 | 49 | 17.9 | 46 |
| 2-8 | D-107 | A-11 | 23.7 | 48 | 21.7 | 46 | 17.6 | 42 |
| 2-9 | D-108 | A-11 | 24.7 | 49 | 22.5 | 46 | 18.0 | 44 |
| 2-10 | D-109 | A-11 | 24.1 | 49 | 22.4 | 47 | 17.7 | 43 |
| 2-11 | D-110 | A-11 | 24.3 | 50 | 21.8 | 47 | 17.8 | 44 |
| 2-12 | D-103 | I-9 | 24.4 | 52 | 23.7 | 50 | 17.8 | 46 |
| 2-13 | D-104 | I-9 | 25.2 | 51 | 24.5 | 50 | 18.5 | 45 |
| 2-14 | D-105 | I-9 | 24.0 | 51 | 22.6 | 47 | 17.8 | 46 |
| 2-15 | D-106 | I-9 | 24.8 | 50 | 22.8 | 49 | 17.7 | 45 |
| 2-16 | D-107 | I-9 | 23.6 | 49 | 21.9 | 46 | 17.4 | 42 |
| 2-17 | D-108 | I-9 | 23.5 | 49 | 22.3 | 45 | 18.0 | 44 |
| 2-18 | D-109 | I-9 | 24.6 | 49 | 22.3 | 46 | 17.2 | 43 |
| 2-19 | D-110 | I-9 | 24.8 | 50 | 21.9 | 47 | 17.1 | 43 |

SYNTHESIS EXAMPLE 1

A mixture of 0.1 mol of p-phenylenediamine, 0.6 mol of p-nitroiodobenzene, 0.25 mol of anhydrous potassium carbonate and 2 parts (by weight) of copper powder was refluxed under stirring in 150 parts of dimethylformamide for 4 days. After the reaction, the reaction mixture was filtered and the filtered product was washed well with dimethylformamide, water and acetone, followed by drying, to obtain 30 parts of reddish brown tetrakis(p-nitrophenyl)-p-phenylenediamine.

The compound obtained above (25 parts) together with 100 part of dimethylformamide and 1 part of palladium-carbon hydrogenation catalyst were added into an autoclave, and hydrogen gas was charged to a presure of 5.0 kg/cm$^2$ and stirring was continued at 90° C. to 100° C. until hydrogen absorption ceased.

After the reaction, the reaction mixture was filtered, the filtered product was washed with dimethylformamide and then filtrate was poured into 350 parts of ice-water. After stirred for a while, the precipitates were collected by filtration. Recrystallization from ethanol-dimethylformamide solvent mixture gave 14 parts of tetrakis(p-aminophenyl)-p-phenylenediamine. The purity by high performance liquid chromatography was found to be 98.7%.

By NMR (d$_6$-DMSO) analysis, absorption of amino group corresponding to 8H at δ3.37 ppm, and absorption of aromatic ring corresponding to 20H of broad doublet at δ6.38 to 6.50 ppm were measured.

SYNTHESIS OF 1-4

The above amino derivative (3 parts) was stirred under heating at 100° C. to 130° C. together with 18 parts of dimethylformamide, 0.7 part of anhydrous sodium hydrogen carbonate and 3.9 parts of 2-methoxyethylbromide. After the reaction for 36 hours, the reaction mixture was poured into 100 parts of ice-water and extracted with ethyl acetate. After drying, the product was purified by silica gel column. Amount obtained 3.4 parts. By IR-absorption analysis, disappearance of the absorption by NH stretching vibration of the amino group was confirmed.

One part of this compound was dispersed in 20 parts of acetone and equimolar amount of silver perchlorate was added to the dispersion under stirring. After the reaction under room temperature for 1 hours, the precipitated silver was separated by filtration, the filtrate was diluted with isopropyl ether and left to stand and the precipitated crystals were collected by filtration. Amount obtained: 0.7 part.

The thus synthesized 1-4 was found to be a compound having a great absorption region in the IR-region with the maximum absorption wavelengths of 1258 nm and 957 nm.

SYNTHESIS OF 2-1

One part of tetrakis-(dimethoxyethylaminophenyl)-phenylenediamine used in synthesis of 1-4 was dispersed in 20 parts of acetone, and 2-fold mols of silver perchlorate were added under stirring. After the reaction under room temperature for 1 hour, the precipitated silver was separated by filtration, and the filtrate diluted with isopropyl ether. 0.55 Parts of precipitated crystals were collected by filtration.

The examples as described are in the case of an anion which is perchlorate, but in the case of other anions, the desired compounds can be easily obtained by use of silver salts corresponding thereto. For example, silver salts such as AgSbF$_6$, AgBF$_4$, AgSO$_4$, AgNO$_3$, AgSO$_3$C$_6$H$_4$CH$_3$, AgSO$_3$CF$_3$, etc. can be used. Otherwise, they can be also obtained by electrolytic oxidation.

SYNTHESIS EXAMPLE 2

The same reaction as in Synthesis example 1 was carried out except for changing p-phenylenediamine used in Synthesis example 1 to benzidine to obtain 12 parts of orange tetrakis(p-amino-phenyl)benzidine.

SYNTHESIS OF 1-38

The amino derivative obtained in Synthesis example 2 (2 parts) was reacted for 16 hours with 40 parts of dimethylformamide, 0.33 part of anhydrous sodium hydrogen carbonate and 0.78 part of 1,4-dibromobutane at 90° C. to 110° C. The reaction mixture was poured into 300 parts of ice-water and, after stirring, the precipitates were filtered, washed with water and ethanol. After drying, the product was separated from the starting materials. Amount obtained: 1.4 parts.

The pyrrolidine derivative obtained above (1 part) was reacted with 20 parts of dimethylformamide, 2.2 parts of butyl iodide and 1 part of anhydrous sodium carbonate at 120° C. for 30 hours. After the reaction, the mixture was poured into 100 parts of ice-water and the product recovered by filtration. By purification with silica gel column, 1.1 parts of the desired product were obtained. By IR-absorption analysis, disappearance of the absorption by the NH stretching vibration of amino group was confirmed.

The above compound (0.5 part) was dispersed in 20 parts of acetone and silver perchlorate was added thereto to carry out the reaction under room temperature for 30 hours. After the reaction, silver was filtered off and the solvent was evaporated from the filtrate to give 0.3 part of the desired product (1-12). The maximum absorption wavelength was 1050 nm.

EXAMPLE 3

On a PMMA substrate with a diameter of 130 mmφ and a thickness of 1.2 mm was provided a pregroove of 50μ, and a solution containing an organic dye of a polymethine dye (IR-820, produced by Nippon Kayaku) and the above IR-ray absorptive compound No. 1-4 dissolved at a weight ratio of 90:10 in 1,2-dichloroethane was applied by spin coating to provide a recording layer of 800 Å. With a spacer of 0.3 mm sandwiched between inner circumference side and the outer circumference side of the medium thus obtained, another PMMA substrate was plastered with a UV-ray adhesive to obtain an optical recording medium of an air-sandwich structure.

With this medium rotated at 1800 rpm, writing of a spot diameter of 1.5 μm φ was effected from the substrate side with a recording power of 6 mW and a recording frequency of 2 MHz by use of a semiconductor laser of 830 nm. Next, reproduction was effected with a reading power of 0.9 mW and the C/N ratio was measured by spectral analysis. Subsequently, the C/N ratio after performing reading for 100,000 times (repeated reproduction) was measured.

Further, light-resistant stability test was performed by irradiaging a xenon lamp light of 1 KW/m$^2$ on the recording medium prepared under the above conditions for 100 hours, and the reflectance and the C/N ratio were measured. The results are shown in Table 2.

EXAMPLE 4

On the same substrate as in Example 3, a recording layer was provided with a solution of 1-guaiazulenyl-5-(6'-t-butyl-4,8-dimethyl-azulenyl)-2,4-pentadienyl perchlorate and the above IR-ray absorptive compound No. 1-20 at a weight ratio of 90:10.

The same test as in Example 3 was conducted with the thus obtained optical recording medium. The results are shown in Table 2.

EXAMPLES 5-8

Optical recording media comprising the compositions shown in Table 1 were prepared in the same manner as in Example 3 and the same test as in Example 3 was conducted. The results are shown in Table 2.

TABLE 1

| Example No. | Dye | IR-absorptive compound No. | Weight ratio |
|---|---|---|---|
| 5 | (p-Diethylaminophenyl)-(phenyl)methylene-1-cyclopente-2-nyl-3-(p-diethylaminophenyl)(phenyl)carbonium perchlorate | 1-7 | 90:10 |
| 6 | 1,5-Bis(diethylaminophenyl)-1,5-diphenyl-2,4-pentadienyl perchlorate | 2-18 | 90:10 |
| 7 | 1,5-Diguaiazulenyl-2,4-pentadienyl perchlorate | 2-10 | 80:20 |
| 8 | 1,1'-Dimethoxyethyl-3,3,3',3'-tetramethyl-2,2'-indotricarbocyanine perchlorate | 2-13 | 70:30 |

COMPARATIVE EXAMPLES 3-4

Optical recording media were prepared and evaluated in the same manner as in Example 3 except for changing the IR-ray absorptive compound used in Example 3 to aminium perchlorate and diimonium perchlorate of N,N,N',N'-tetrakis(p-di-n-butylaminophenyl)-p-phenylenediamine. The results are shown in Table 2.

COMPARATIVE EXAMPLES 5-7

Optical recording media were prepared and evaluated except for using no IR-ray absorptive compound in Examples 4 to 6. The results are shown in Table 2.

TABLE 2

| | | Initial stage | | After repeated reproduction | After light resistance test | |
|---|---|---|---|---|---|---|
| | | Reflectance (%) | C/N(dB) | C/N(dB) | Reflectance (%) | C/N(dB) |
| Example | 3 | 24.8 | 57 | 55 | 22.8 | 54 |
| | 4 | 27.8 | 54 | 54 | 23.3 | 51 |
| | 5 | 25.0 | 54 | 53 | 20.7 | 49 |
| | 6 | 25.5 | 55 | 53 | 21.2 | 52 |
| | 7 | 27.1 | 52 | 52 | 22.1 | 50 |
| | 8 | 34.6 | 53 | 50 | 22.6 | 48 |
| Comparative Example | 3 | 25.0 | 57 | 55 | 22.5 | 53 |
| | 4 | 24.8 | 56 | 55 | 21.8 | 52 |
| | 5 | 28.1 | 54 | 51 | 18.4 | 40 |
| | 6 | 24.7 | 54 | 49 | 16.3 | 38 |
| | 7 | 25.8 | 55 | 48 | 16.9 | 39 |

EXAMPLES 9-13

On a polycarbonate (hereinafter abbreviated as "PC") substrate with a thickness of 0.4 mm of Waret size was provided a pregroove by the hot press method, and a solution of the organic dye and the IR-ray absorptive compound shown in Table 3 mixed in diacetone alcohol was applied by the bar coating method, followed by drying to obtain a recording layer of 850 Å. Further, with a 0.3 mm PC substrate of Waret-size through an ethylene-vinyl acetate dry film thereon, an optical recording medium with an adhered structure was prepared according to the hot roll method.

The optical recording medium of Example thus prepared was mounted on the stage driven in the X—Y direction, and an information was written on the organic thin film recording layer from the 0.4 mm thick PC substrate side in the Y-axis direction with a spot size of 3.0 $\mu m\phi$, a recording power of 4.0 mW and a recording pulse of 80 $\mu$sec by use of a semiconductor laser with an oscillation wavelength of 830 nm, and reproduced with a reading power of 0.4 mW, and its contrast ratio (A−B/A: A→signal strength at unrecorded portion, B→signal strength at recorded portion) was measured.

Further, the same recording medium prepared under the above conditions was subjected to light-resistant stability test under the same conditions as in Example 3, and thereafter the reflectance and the contrast ratio were measured. The results are shown in Table 4.

TABLE 3

| Example No. | Organic dye | IR-absorptive compound No. | Weight ratio |
|---|---|---|---|
| 9 | IR-820 (produced by Nippon Kayaku) | 1-13 | 80:20 |
| 10 | IR-820 (produced by Nippon Kayaku) | 1-10 | 85:15 |
| 11 | 1,5-Bis(dipropylaminophenyl)-1,5-diphenyl-2,4-pentadienyl perchlorate | 1-22 | 70:30 |
| 12 | (p-Dimethylaminophenyl)-p-(tolyl)methylene-1-cyclopente-phenyl-3-(p-dimethylaminophenyl)-(p-tolyl)carbonium perchlorate | 2-5 | 80:20 |
| 13 | 1,1'-Dimethoxyethyl-3,3,3',3'-tetramethyl-2,2'-indotricarbocyanine perchlorate | 2-20 | 70:30 |

COMPARATIVE EXAMPLES 8-11

Except for changing the IR-ray absorptive compound to tetrafluoroborate of tetrakis(p-di-n-butylaminophehyl)-phenylenediimonium, optical recording media were prepared and evaluated in the same manner as in Examples 9, 10, 11 and 12. The results are shown in Table 4.

|  | | Reflectance (%) | Contrast ratio | Reflectance (%) | Contrast ratio |
|---|---|---|---|---|---|
| Example | 9 | 15.0 | 0.82 | 12.8 | 0.77 |
|  | 10 | 14.8 | 0.82 | 13.1 | 0.79 |
|  | 11 | 15.2 | 0.80 | 13.0 | 0.75 |
|  | 12 | 15.1 | 0.83 | 13.3 | 0.77 |
|  | 13 | 18.6 | 0.85 | 13.7 | 0.75 |
| Comparative Example | 8 | 14.8 | 0.82 | 12.5 | 0.71 |
|  | 9 | 15.0 | 0.82 | 11.8 | 0.70 |
|  | 10 | 14.9 | 0.84 | 12.2 | 0.73 |
|  | 11 | 18.3 | 0.86 | 12.1 | 0.71 |

We claim:

1. An optical recording medium capable of optically detecting or imaging a pit therein, comprising a substrate and a recording layer containing (i) at least one aminium or diimonium salt compound represented by formulae (5) and (6) and (ii) dye:

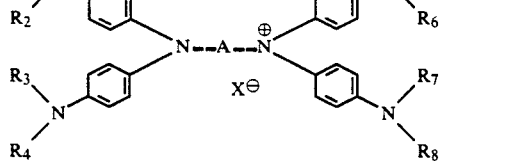

(wherein A represents

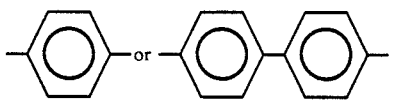

which may be substituted with alkyl, halogen or alkoxy; $X^\ominus$ represents an anion; $R_1$ through $R_8$ each represent a substituent having 1 to 8 carbon atoms, and at least one of them is an alkoxyalkyl group, an alkenyl group or alkynyl group).

2. An optical recording medium according to claim 1, wherein said recording layer contains a polymethine type dye.

3. An optical recording medium according to claim 2, wherein said recording layer contains at least one polymethine type dye represented by the group consisting of formulae (1-I) through (2-IV) shown below

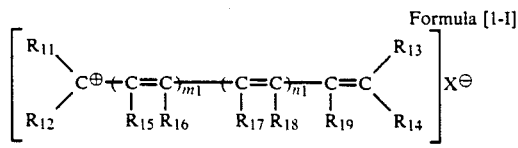

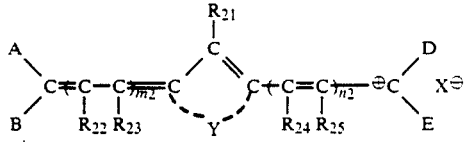

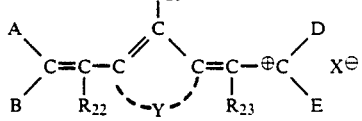

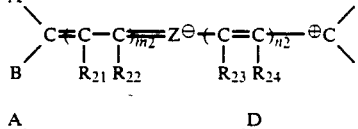

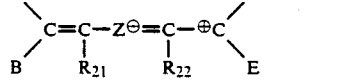

wherein $R_{11}$, $R_{12}$, $R_{13}$, $R_{14}$, $R_{15}$, $R_{16}$, $R_{17}$, $R_{18}$ and $R_{19}$ each represent hydrogen atom, a halogen atom a substituted or unsubstituted alkyl group, a substituted or unsubstituted aryl group, a substituted or unsubstituted styryl group or a substituted or unsubstituted heterocyclic group with the proviso that at least one of $R_{11}$, $R_{12}$, $R_{13}$ and $R_{14}$ is a dialkylamino-substituted aryl group; $m_1$ is 0 or 1; $n_1$ is 0, 1 or 2; A, B, D and E each represent hydrogen atom, a halogen atom, a substituted or unsubstituted alkyl group, and alkenyl group, a substituted or unsubstituted aralkyl group, a substituted or unsubstituted aryl group with the proviso that at least one of A, B, D and E is a dialkylamino-substituted aryl group; $R_{21}$, $R_{22}$, $R_{23}$, $R_{24}$ and $R_{25}$ each represent hydrogen atom, a halogen atom or an alkyl group; $m_2$ and $n_2$ are each 0, 1 or 2; Y represents a divalent residue having a group of atoms sufficient for completing a 5-membered or a 6-membered ring; $Z^\ominus$ represents

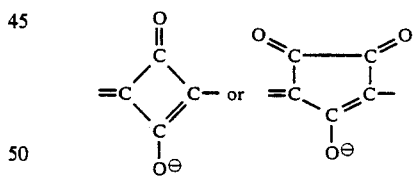

and $X^\ominus$ represents an anion.

4. An optical recording medium according to claim 3, wherein the polymethine type dye represented by the formula [1-I], at least one of $R_{11}$ and $R_{12}$ and at least one of $R_{13}$ and $R_{14}$ are dialkylamino-substituted aryl groups.

5. An optical recording medium according to claim 4, wherein the dialkylamino-substituted aryl group is a dialkylamino-substituted aryl group having an alkyl group with 1 to 4 carbon atoms.

6. An optical recording medium according to claim 3, wherein the polymethine type dyes represented by the formulae [2-I] through [2-IV], at least one of A and B and at least one of D and E are dialkylamino-substituted aryl groups.

7. An optical recording medium according to claim 6, wherein the dialkylamino-substituted aryl group is a dialkylamino-substituted aryl group having an alkyl group with 1 to 4 carbon atoms.

8. An optical recording medium according to claim 1, wherein the compound selected from aminium salt compounds and diimonium salt compounds is contained in an amount of 1 to 60% by weight in the recording layer.

9. An optical recording medium according to claim 1, wherein the compound selected from aminium salt compounds and diimonium salt compounds is contained in an amount of 5 to 40% by weight in the recording layer.

10. An optical recording medium according to claim 1, wherein said recording layer is provided with a protective layer.

* * * * *

UNITED STATES PATENT AND TRADEMARK OFFICE
CERTIFICATE OF CORRECTION

PATENT NO. : 4,923,390
DATED : May 8, 1990
INVENTOR(S) : YOSHIHIRO OGUCHI ET AL.   Page 1 of 4

It is certified that error appears in the above-identified patent and that said Letters Patent is hereby corrected as shown below:

ON TITLE PAGE:

AT [54] TITLE

"MEDIUM IR-RAY" should read --MEDIUM, IR-RAY--.

COLUMN 1

Line 2, "MEDIUM IR-RAY' should read --MEDIUM, IR-RAY--.
    Line 19, "memory" should read --memorize--.
    Line 59, "have" should read --has--.

COLUMN 4

Line 35, "DRAWING" should read --DRAWINGS--.

COLUMN 5

Line 6, "α-naphtylmethyl," should read --α-naphthylmethyl,--.
    Line 10, "substitute" should read --substituted--.
    Line 21, "ethoxystytyl," should read --ethoxystyryl--.
    Line 30, "2-(diethylaminophenyl)-2-ehtylvinyl," should read --2-(diethylaminophenyl)-2-ethylvinyl,--.
    Line 41, "tetrafloroborate," should read --tetrafluoroborate,--.
    Line 46, "florosulfonate," should read --fluorosulphonate--.
    Line 47, "trifloromethanesulfonate," should read --trifluoromethanesulfonate,--.

UNITED STATES PATENT AND TRADEMARK OFFICE
CERTIFICATE OF CORRECTION

PATENT NO. : 4,923,390

DATED : May 8, 1990

INVENTOR(S) : YOSHIHIRO OGUCHI ET AL.

It is certified that error appears in the above-identified patent and that said Letters Patent is hereby corrected as shown below:

COLUMN 6

Lines 22, "phnethyl, α-naphtylmethyl," should read
        --phenylethyl, α-naphthylmethyl,--.
    Line 36, "ethoxystytyl," should read --ethoxystyryl--.
    Line 66, "α-naphtylmethyl," should read
        --α-naphthylmethyl--.

COLUMN 8

Line 34, "spacial" should read --spatial--.

COLUMN 29

Line D-53, "-BF$_4$" should read --BF$_4$--.

COLUMN 31

Line 67, "Bernard S. wildi et al," should read
        --Bernard S. Wildi et al,--.

COLUMN 33

Formula [3], "-N~ ∩ A~N -" should read
        -- -N ---- A ---- N- --.
    Line 46, "naphthlmethyl," should read
        --naphthylmethyl,--.

COLUMN 38

Compound No. 1-1, "OCH$_3$" should read --OCH3)--.

UNITED STATES PATENT AND TRADEMARK OFFICE
CERTIFICATE OF CORRECTION

PATENT NO. : 4,923,390

DATED : May 8, 1990

INVENTOR(S) : YOSHIHIRO OGUCHI ET AL.

It is certified that error appears in the above-identified patent and that said Letters Patent is hereby corrected as shown below:

COLUMN 39

Compound No. 1-10, "$CH_2CH_2OC_2H_5)$" should read --$CH_2CH_2OC_2H_5)_4$--.

COLUMN 43

Line 19, "-co-telephthalate)," should read -- -co-terephthalate),--.

COLUMN 44

Line 45, "(carrier/oise ratio)." should read --(carrier/noise ratio).--.

COLUMN 46

Line 36, "plymethine dye" should read --polymethine dye--.

Line 51, "PC substate side" should read --PC substrate side--.

COLUMN 50

Line 50, "130 mm o" should read --130 mm $\phi$--.

COLUMN 51

Line 2, "(carrier/oise ratio)." should read --(carrier/noise ratio).--.

UNITED STATES PATENT AND TRADEMARK OFFICE
CERTIFICATE OF CORRECTION

PATENT NO. : 4,923,390

DATED : May 8, 1990

INVENTOR(S) : YOSHIHIRO OGUCHI ET AL.    Page 4 of 4

It is certified that error appears in the above-identified patent and that said Letters Patent is hereby corrected as shown below:

COLUMN 53

Line 52, "PC substate side" should read
        --PC substrate side--.

COLUMN 60

Line 60, "irradiaging" should read --irradiating--.

COLUMN 64

Line 63, "wherein the" should read --wherein, in the--.

Signed and Sealed this

Thirty-first Day of March, 1992

Attest:

HARRY F. MANBECK, JR.

Attesting Officer      Commissioner of Patents and Trademarks